United States Patent [19]
Yamada et al.

[11] Patent Number: 5,969,496
[45] Date of Patent: Oct. 19, 1999

[54] METHOD OF CONTROLLING OPERATION OF SYNCHRONOUS MOTOR AND MOTOR CONTROL APPARATUS FOR THE SAME

[75] Inventors: Eiji Yamada, Owariasahi; Yasutomo Kawabata, Aichi-ken, both of Japan

[73] Assignee: Toyota Jidosha Kabushiki Kaisha, Toyota, Japan

[21] Appl. No.: 09/102,356

[22] Filed: Jun. 23, 1998

[30] Foreign Application Priority Data

Jun. 23, 1997 [JP] Japan ................................ 9-183028

[51] Int. Cl.$^6$ ............................................ H02P 1/46
[52] U.S. Cl. .................. 318/715; 318/721; 318/254; 318/138; 318/439; 318/700; 318/720; 318/724
[58] Field of Search ................................. 318/721, 254, 318/138, 439, 700, 720, 724

[56] References Cited

U.S. PATENT DOCUMENTS 5,608,300  3/1997  Kawabata et al. .................... 318/721

FOREIGN PATENT DOCUMENTS 7-177788  7/1995  Japan .

*Primary Examiner*—Karen Masih
*Attorney, Agent, or Firm*—Oblon, Spivak, McClelland, Maier & Neustadt, P.C.

[57] ABSTRACT

At the time of starting a synchronous motor (40), one method of the present invention assumes that the synchronous motor (40) rotates at a revolving speed of not less than a predetermined level, and detects an electrical angle of a rotor (50) according to a first detection process, which has a practical accuracy when the revolving speed of the rotor (50) is not less than the predetermined level (step S120). In case that the electrical angle has not been detected successfully, the method detects the electrical angle of the rotor (50) according to a second detection process, which has a practical accuracy when the revolving speed of the rotor (50) is less than the predetermined level (step S160). Another method first detects the revolving speed of the rotor (50). The method adopts the first detection process to detect the electrical angle when the observed revolving speed is not less than a predetermined level, and adopts the second detection process when the observed revolving speed is less than the predetermined level. Even when the rotor (50) has already been rotated by an external force or inertia at the time of starting the synchronous motor (40), the method enables accurate detection of the electrical angle.

11 Claims, 17 Drawing Sheets

| POSITIVE VOLTAGE PHASE CURRENT Iu | NEGATIVE VOLTAGE PHASE CURRENT \|Iv\| | NEGATIVE VOLTAGE PHASE CURRENT \|Iw\| | ELECTRICAL ANGLE $\theta$ |
|---|---|---|---|
| 100 | 10 | 20 | 10 |
| 90 | 20 | 10 | 20 |
| 80 | 30 | 5 | 30 |
| 70 | 35 | 2 | 40 |
| 65 | 38 | 2 | 50 |
| 60 | 40 | 5 | 60 |
| 55 | 41 | 10 | 70 |
| 50 | 41 | 20 | 80 |
| ⋮ | ⋮ | ⋮ | ⋮ |

Fig. 17

METHOD OF CONTROLLING OPERATION OF SYNCHRONOUS MOTOR AND MOTOR CONTROL APPARATUS FOR THE SAME

BACKGROUND OF THE INVENTION

1. Field of the Invention

The present invention relates to a method of detecting an electrical angle in a synchronous motor in a sensor-free manner and regulating electric currents flowing through polyphase windings of the synchronous motor, so as to control operation of the synchronous motor. The present invention also pertains to an apparatus for the same.

2. Description of the Related Art

A motor control apparatus for controlling operation of a synchronous motor generally has a unit that detects an electrical angle of a rotor, and regulates the electric currents flowing through polyphase windings according to the observed electrical angle of the rotor. Resolvers, encoders, and other sensors may be applicable for the electrical angle detection unit. Sensor-free structures that detect the electrical angle based on the electric currents flowing through the windings have, however, proposed recently, in order to enhance the reliability of detection.

The applicants of the present invention have proposed a device that detects an electrical angle of a synchronous motor at a high accuracy even when a rotor is at a stop or rotates at a low revolving speed (JAPANESE PATENT LAID-OPEN GAZETTE No. 7-177788). The proposed device measures behaviors of electric currents flowing through the windings and detects the inductance of the windings, which is affected by the position of the rotor, and thereby the electrical angle according to the observed behaviors of the electric currents. This device is based on the finding that detection of the behaviors of electric currents flowing through any two phases leads to unequivocal determination of the electrical angle in the case of a three-phase synchronous motor. This technique is specifically effective when the rotor rotates at a low revolving speed. The applicants of the present invention accordingly have proposed a structure that detects the electrical angle according to the behaviors of electric currents flowing through the respective phase coils while the rotor is at a stop or rotates at a revolving speed of less than a predetermined level. The structure adopts the conventional method of detection utilizing the counterelectromotive forces when the revolving speed of the rotor is not less than the predetermined level. This structure thus enables the electrical angle to be detected at a high accuracy, irrespective of the rotation of the rotor, that is, whether the rotor is at a stop, rotates at a low revolving speed, or rotates at a high revolving speed.

The proposed electrical angle detection device, which detects the electrical angle based on the behaviors of electric currents, does not require a sensor, such as a resolver, but enables the electrical angle to be detected at a high accuracy even when the rotor rotates at a low revolving speed. When the electrical angle detection device is actually incorporated in a motor control apparatus that controls operation of a synchronous motor, however, problems discussed below arise in some applications of the synchronous motor. In the normal application of the synchronous motor, operation of the synchronous motor starts from the state in which the rotor is at a stop. It can thus be assumed that measurement of the electrical angle starts from the state in which no electromotive forces are generated in the respective windings of the synchronous motor. In case that the synchronous motor is attached to, for example, a drive shaft of a vehicle, the rotor may rotate with a rotation of the drive shaft, although the synchronous motor is not specifically used either as a motor or a generator. In such cases, the electromotive forces due to the rotation of the rotor cause electric currents flow through the respective phase coils. Under these conditions, a voltage is applied between the phase coils and the behaviors of electric currents are measured. The electrical angle determined from the observed behaviors of electric currents may accordingly not represent the actual electrical angle of the rotor accurately.

SUMMARY OF THE INVENTION

The object of the present invention is thus to accurately detect an electrical angle and adequately regulate phase currents flowing through polyphase windings of a synchronous motor, irrespective of application of the synchronous motor or more specifically irrespective of the rotation of the synchronous motor.

At least part of the above and the other related objects is realized by a first method of controlling operation of a synchronous motor, the synchronous motor making polyphase alternating currents flow through polyphase windings and rotating a rotor by an interaction of a magnetic field formed by the windings with a magnetic field formed by a permanent magnet. The first method of the present invention enables accurate detection of the electrical angle of the rotor and adequate regulation of electric currents flowing through the polyphase windings, even when the rotor has already been rotated at the time of starting operation of the synchronous motor.

Part of the objects is also realized by a second method of controlling operation of a synchronous motor, the synchronous motor making polyphase alternating currents flow through polyphase windings and rotating a rotor by an interaction of a magnetic field formed by the windings with a magnetic field formed by a permanent magnet. The second method of the present invention determines whether or not the rotor rotates at the revolving speed of not less than a predetermined level prior to a start of operation of the synchronous motor, and adopts the appropriate electrical angle detection process according to the revolving speed of the rotor. This method thus enables the electric currents flowing through the polyphase windings to be regulated adequately.

In accordance with one preferable application of the method, the first detection process detects the electrical angle of the rotor based on a motor model, and the second detection process detects the electrical angle based on an inductance of the polyphase windings. These techniques may not be adopted in pair, but the first detection process of the second detection process may be combined with another available technique.

The present invention is also directed to a first motor control apparatus that controls operation of a synchronous motor, the synchronous motor making polyphase alternating currents flow through polyphase windings and rotating a rotor by an interaction of a magnetic field formed by the windings with a magnetic field formed by a permanent magnet. In the first motor control apparatus of the present invention, immediately after a start of operation of the synchronous motor, the first electrical angle detection unit detects the electrical angle according to the first detection process, and the revolving speed computation unit calculates the revolving speed of the rotor from the detected electrical angle. In case that the calculated revolving speed is less than a predetermined level, the switching unit activates the second electrical angle detection unit to detect the electrical angle according to the second detection process. The second detection process has a practical accuracy when the revolving speed of the rotor is less than the predetermined level. The control unit then regulates the electric currents flowing through the polyphase windings, based on the electrical angle detected by the second electrical angle detection unit, thereby enabling adequate operation of the synchronous motor. In case that the calculated revolving speed is not less than the predetermined level, on the other hand, the first electrical angle detection unit continues detecting the electrical angle. The control unit then regulates the electric currents flowing through the polyphase windings, based on the electrical angle detected by the first electrical angle detection unit. The structure of the first motor control apparatus thus enables operation of the synchronous motor to be controlled adequately, irrespective of the revolving speed of the rotor.

In accordance with one preferable application of the first motor control apparatus, the first detection process adopted in the first electrical angle detection unit detects the electrical angle of the rotor based on a motor model, and the second detection process adopted in the second electrical angle detection unit detects the electrical angle based on an inductance of the polyphase windings.

In accordance with another preferable application of the first motor control apparatus, the second electrical angle detection unit includes: a voltage application unit that applies a predetermined voltage to a certain combination selected among the polyphase windings; a current behavior detection unit that detects behaviors of the polyphase currents flowing through the polyphase windings in response to the voltage applied by the voltage application unit; a storage unit that stores a relationship between the electrical angle of the rotor and the behaviors of the polyphase currents flowing through the polyphase windings in response to the predetermined voltage applied to the certain combination, the relationship being determined in advance; and an electrical angle computation unit that refers to the relationship stored in the storage unit and specifies the electrical angle of the rotor in a range of 0 to $2\pi$ corresponding to the behaviors of the polyphase currents detected by the current behavior detection unit. This structure enables detection of the electrical angle based on the inductance of the circuit, which depends upon the position of the rotor.

In accordance with still another preferable application, the second electrical angle detection unit may detect the electrical angle while a driving current flows through the polyphase windings. In one concrete structure, for example, the second electrical angle detection unit includes: a voltage application unit that applies a predetermined voltage to the polyphase windings; a current behavior detection unit that detects behaviors of the polyphase currents flowing through the polyphase windings in response to the voltage applied by the voltage application unit; a driving current detection unit that detects a driving current supplied to the polyphase windings at a time of application of the predetermined voltage; a storage unit that stores a relationship between the electrical angle of the rotor and the behaviors of the polyphase currents flowing through the polyphase windings in response to application of the predetermined voltage while the driving current flows through the synchronous motor, the relationship being determined in advance; and an electrical angle computation unit that refers to the relationship stored in the storage unit and specifies the electrical angle of the rotor in a range of 0 to $2\pi$ corresponding to the behaviors of the polyphase currents detected by the current behavior detection unit and the driving current detected by the driving current detection unit. This structure eliminates the effects of the driving current and enables the electrical angle to be determined according to the behaviors of the electric currents flowing through the polyphase windings.

The present invention is further directed to a second motor control apparatus that controls operation of a synchronous motor, the synchronous motor making polyphase alternating currents flow through polyphase windings and rotating a rotor by an interaction of a magnetic field formed by the windings with a magnetic field formed by a permanent magnet. In the second motor control apparatus of the present invention, it is determined whether or not the rotor rotates at the revolving speed of not less than a predetermined level, prior to a start of operation of the synchronous motor. The appropriate detection process is then adopted to detect the electrical angle according to the revolving speed of the rotor. The first control unit and the second control unit thus adequately regulate the electric currents flowing through the polyphase windings.

In accordance with one preferable application of the second motor control apparatus, the revolving speed determination unit includes: a short-circuit current detection unit that short-circuits the polyphase windings, through which the polyphase currents flow, for a predetermined time period and detects a short-circuit current flowing through the short-circuited polyphase windings; and a revolving speed computation unit that calculates the revolving speed of the rotor from the detected short-circuit current, wherein the revolving speed determination unit carries out the determination based on the revolving speed calculated by the revolving speed computation unit. While the rotor rotates, a short-circuit current flows through the windings. The revolving speed of the rotor can be readily obtained from the magnitude of the detected short-circuit current.

In accordance with another preferable application of the second motor control apparatus, the first detection process adopted in the first control unit detects the electrical angle of the rotor based on a motor model, and the second detection process adopted in the second control unit detects the electrical angle based on an inductance of the polyphase windings.

These and other objects, features, aspects, and advantages of the present invention will become more apparent from the following detailed description of the preferred embodiments with the accompanying drawings.

BRIEF DESCRIPTION OF THE DRAWINGS

FIG. 17 is a circuit diagram schematically illustrating a motor current control circuit 400 with a circuit for realizing the first electrical angle detection process based on a motor model;

DESCRIPTION OF THE PREFERRED EMBODIMENTS

Figure 1:
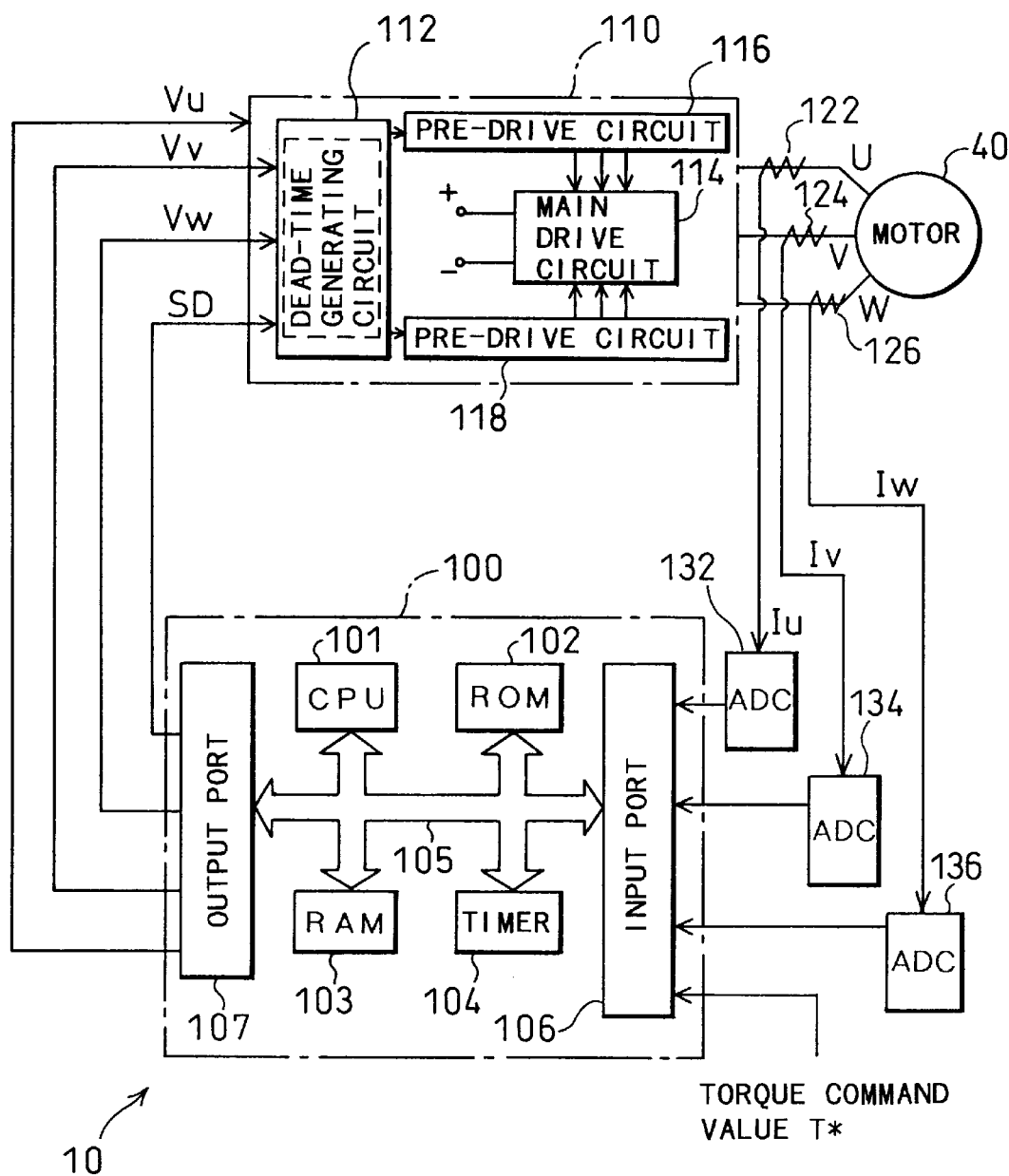
FIG. 1 is a block diagram schematically illustrating structure of a motor control apparatus 10 as a first embodiment according to the present invention.
Figure 2:
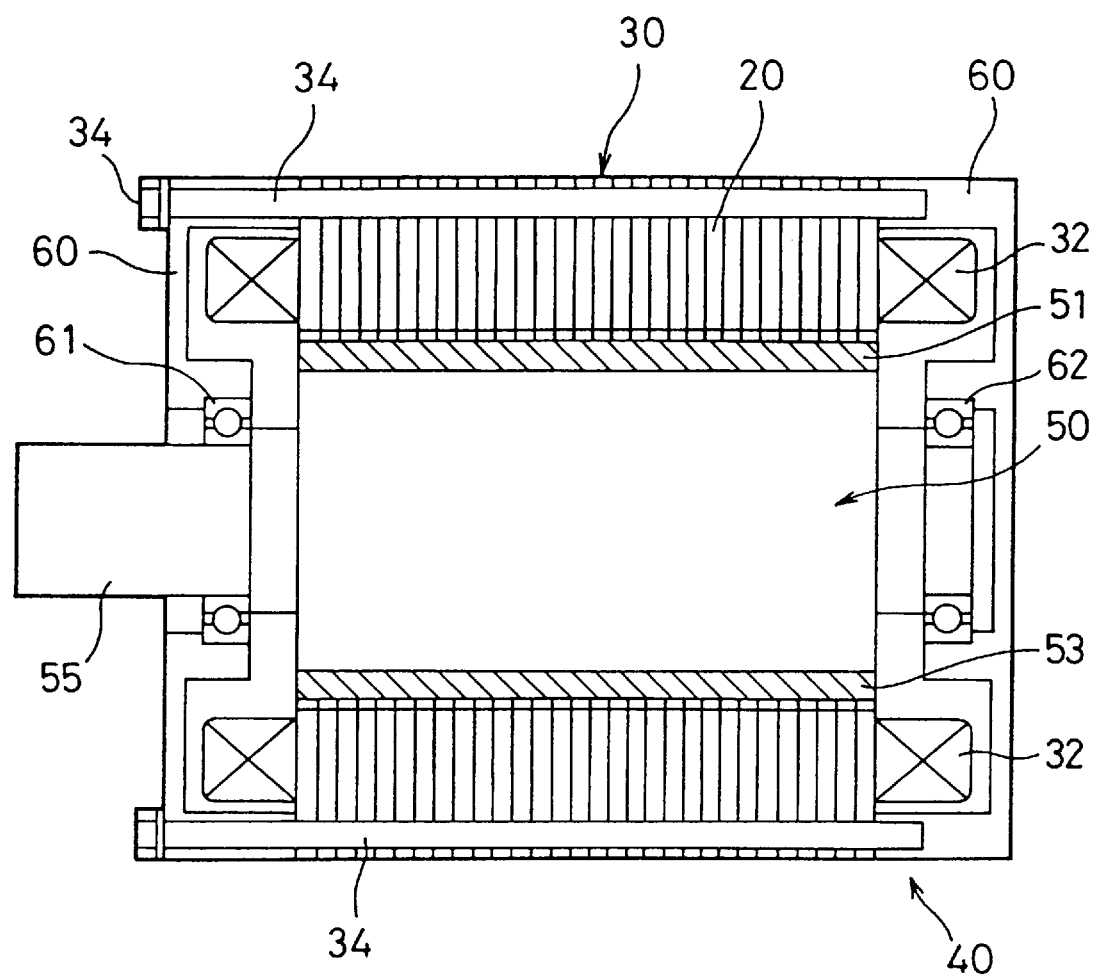
FIG. 2 schematically illustrates structure of a three-phase synchronous motor 40, which is to be controlled in the first embodiment.
Figure 3:
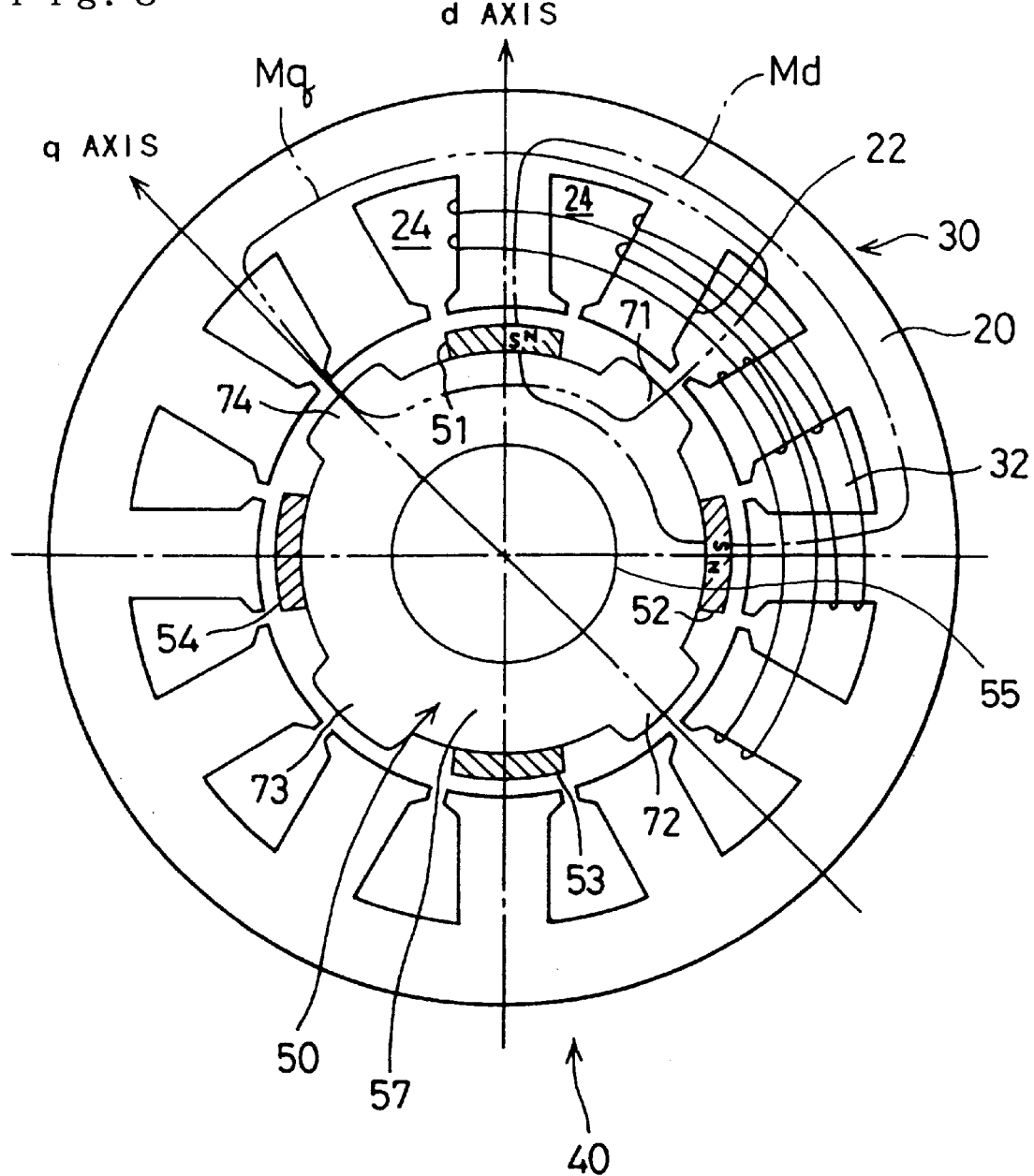
FIG. 3 is an end view illustrating a stator 30 and a rotor 50 of the three-phase synchronous motor 40.

Some modes of carrying out the present invention are described below as preferred embodiments. FIG. 1 is a block diagram schematically illustrating structure of a motor control apparatus 10 as a first embodiment according to the present invention. FIG. 2 schematically illustrates structure of a three-phase synchronous motor 40, which is the object to be controlled. FIG. 3 is an end view illustrating a stator 30 and a rotor 50 of the three-phase synchronous motor 40.

The general structure of the three-phase synchronous motor 40 is described first with the drawing of FIG. 2. The three-phase synchronous motor 40 includes the stator 30, the rotor 50, and a casing 60 for accommodating the stator 30 and the rotor 50 therein. The rotor 50 has permanent magnets 51 through 54 attached to the outer circumference thereof and is provided with a rotating shaft 55. The rotating shaft 55 passes through the axial center of the rotor 50 and is rotatably supported by bearings 61 and 62 disposed in the casing 60.

The rotor 50 is prepared by laying a plurality of rotor elements 57, which are punched out of a non-directional electromagnetic steel plate, one upon another. Each rotor 57 has four salient poles 71 through 74 arranged in a cross configuration as shown in FIG. 3. The rotating shaft 55 is pressed into the laminate of the rotor elements 57, so as to temporarily fix the laminate of the rotor elements 57. Each rotor 57 composed of the electromagnetic steel plate has an insulating layer and an adhesive layer formed on the surface thereof. The laminate of the rotor elements 57 is heated to a predetermined temperature, which fuses the adhesive layers and thereby fixes the laminate of the rotor elements 57.

After the assembly of the rotor 50, the permanent magnets 51 through 54 are attached to the outer circumferential surface of the rotor 50 along the axis of the rotor 50 at the positions between the salient poles 71 through 74. The permanent magnets 51 through 54 are magnetized in the direction of their thickness. In the state that the rotor 50 is combined with the stator 30, a pair of the permanent magnets 51 and 52 forms a magnetic path Md that passes through the rotor elements 57 and stator elements 20 (described below) as shown by the one-dot chain line in FIG. 3.

The stator 30 is prepared by laying a plurality of stator elements 20, which are punched out of a non-directional electromagnetic steel plate like the rotor elements 57, one upon another. Each stator element 20 has twelve teeth 22 as shown in FIG. 3. Coils 32 for causing the stator 30 to generate a revolving magnetic field are wound on slots 24 formed between the teeth 22. Bolt holes, each of which receives a fixation bolt 34, are formed in the outer circumference of the stator element 20, although being omitted from the illustration of FIG. 3.

The stator 30 is temporarily fixed by heating the laminate of the stator elements 20 under pressure and fusing the adhesive layers thereof. In this state, the coils 32 are wound on the teeth 22 to complete the stator 30. The stator 30 is then placed in the casing 60 and fixed to the casing 60 by fitting the fixation bolts 34 in the bolt holes. The rotor 50 is then rotatably attached to the casing 60 by means of the bearings 61 and 62. This completes the assembly of the three-phase synchronous motor 40.

When an excitation current is flown to generate a revolving magnetic field on the stator coils 32 of the stator 30, a magnetic path Mq is formed to pass through the adjoining salient poles as well as the rotor elements 57 and the stator elements 20 as shown by the two-dot chain line in FIG. 3. The axis 'd' represents the axis through which the magnetic flux formed by the permanent magnet 52 passes in the radial direction of the rotor 50, whereas the axis 'q' represents the axis through which the magnetic flux formed by the stator coils 32 of the stator 30 passes in the radial direction of the rotor 50. In this embodiment (where the number of poles=4), the axes 'd' and 'q' are electrically arranged at right angles.

Referring to FIG. 1, structure of the motor control apparatus 10 is described. The motor control apparatus 10 mainly includes a control ECU 100 that regulates three-phase (U, V, and W phases) motor currents of the three-phase synchronous motor 40 in response to a torque command value T* input from outside, an inverter 110 that regulates electric currents flowing through the respective phases of the stator coils 32 in the three-phase synchronous motor 40 in response to an instruction from the control ECU 100, electric current meters 122, 124, and 126 that respectively measure the electric currents flowing through the respective phases of the stator coils 32 in the three-phase synchronous motor 40, and A/D converters (ADC) 132, 134, and 136 that respectively convert the observed values of these meters 122 through 126 to digital signals.

As illustrated in FIG. 1, the control ECU 100 includes a microprocessor (CPU) 101 that carries out arithmetic and logic operations, a ROM 102 in which data required for the operations of the CPU 101 are stored in advance, a RAM 103, which data required for the operations of the CPU 101 are temporarily written in and read from, and a timer 104 that counts the time. These elements 101 through 104 are mutually connected by a bus 105. An input port 106 and an output port 107 are also connected to the bus 105. The CPU 101 reads electric currents Iu, Iv, and Iw flowing through the respective phases U, V, and W of the three-phase synchronous motor 40 and controls the driving state of the inverter 110 via these ports 106 and 107.

Figure 4:
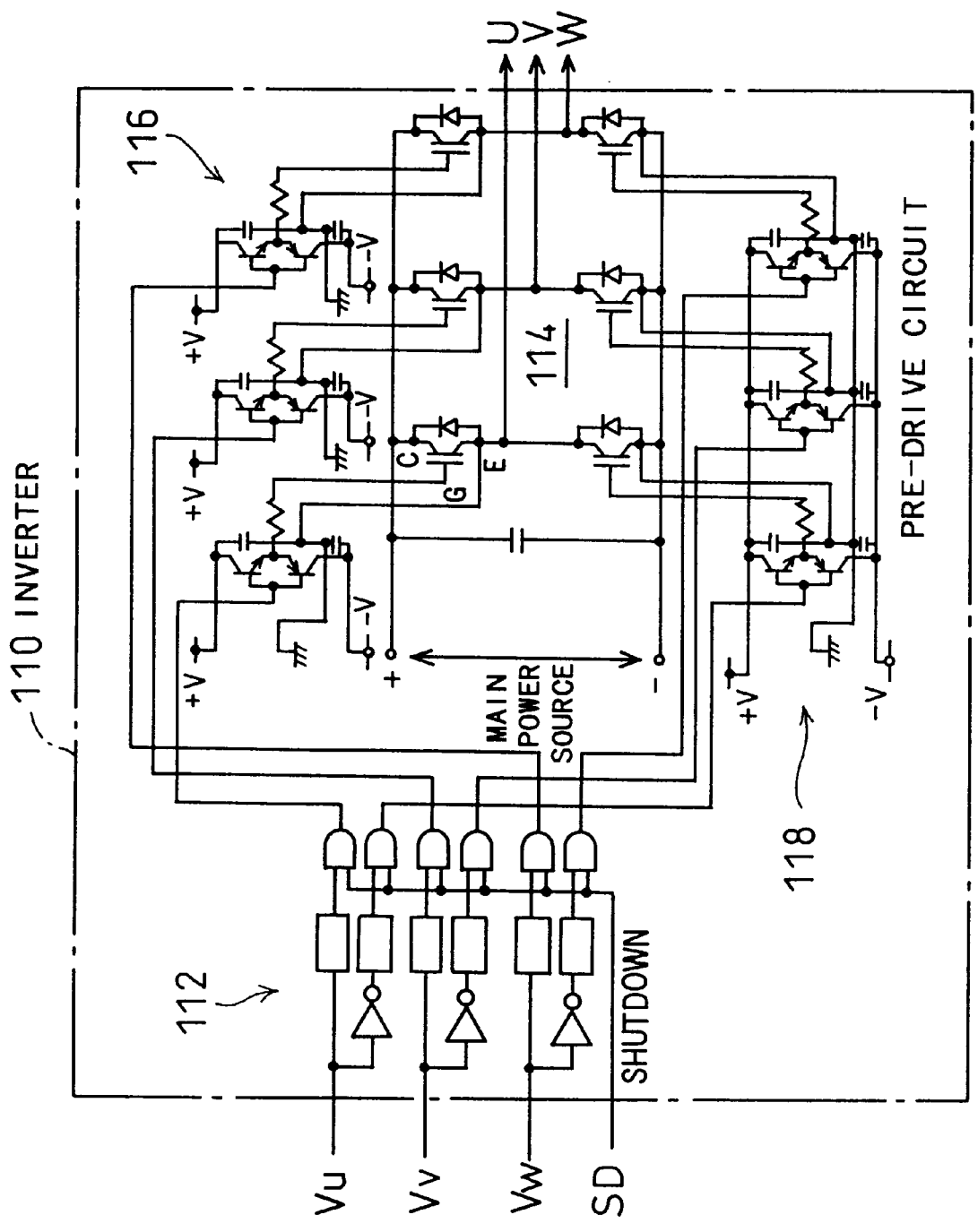
FIG. 4 is a circuit diagram illustrating internal structure of the inverter 110 of the first embodiment.

FIG. 4 is a circuit diagram illustrating internal structure of the inverter 110. The inverter 110 includes an interface unit 112 functioning as an interface with the control ECU 100, a main drive circuit 114 that consists of six high-power switching transistors and directly regulates supply of electricity to the respective phases of the three-phase synchronous motor 40, and pre-drive circuits 116 and 118 that respectively drive the main drive circuit 114 on the side of the source and on the side of the drain. The symbols '+' and '−' in FIG. 4 are connected to a main power source for driving the three-phase synchronous motor 40. The symbols '+V' and '−V' represent stabilized positive and negative power sources for control in the inverter 110, which are respectively connected to power circuits (not shown). Outputs of the main drive circuit 114 are connected to the respective phase coils of the three-phase synchronous motor 40. The electric current meters 122, 124, and 126 that measure the electric currents flowing through the U phase, the V phase, and the W phase are disposed in the lines connecting the main drive circuit 114 with the three-phase synchronous motor 40.

The interface unit 112 is a circuit that receives signals from the control ECU 100 and outputs required signals to the pre-drive circuits 116 and 118. The interface unit 112 specifically includes a dead-time generating circuit that generates a dead time to prevent any pair of the transistors in the main drive circuit 114 from being activated simultaneously. The interface unit 112 also includes a gate that blocks transmission of all the signals to the pre-drive circuits 116 and 118 in response to an SD signal output from the control ECU 100 and thereby cuts off the electric currents in case of emergency.

The pre-drive circuits 116 and 118 switch on and off the high-power switching transistors of the main drive circuit 114 at a high speed. In this embodiment, insulated-gate bipolar transistors (IGBT) are applied for the high-power switching transistors.

In the motor control apparatus 10 thus constructed, the control ECU 100 carries out the following control procedures in the normal driving state:

(1) In case that the three-phase synchronous motor 40 rotates at or above a predetermined speed (100 rpm in this embodiment), a first process of detecting electrical angle (described later) is applied to detect an electrical angle θ of the rotor 50 and control the inverter 110, in order to regulate the electric currents of the respective phases according to the observed electrical angle θ.

(2) In case that the revolving speed of the three-phase synchronous motor 40 is less than the predetermined speed, a second process of detecting electrical angle (described later) is applied to detect the electrical angle θ of the rotor 50 and control the inverter 110, in order to regulate the electric currents of the respective phases according to the observed electrical angle θ.

Figure 5:
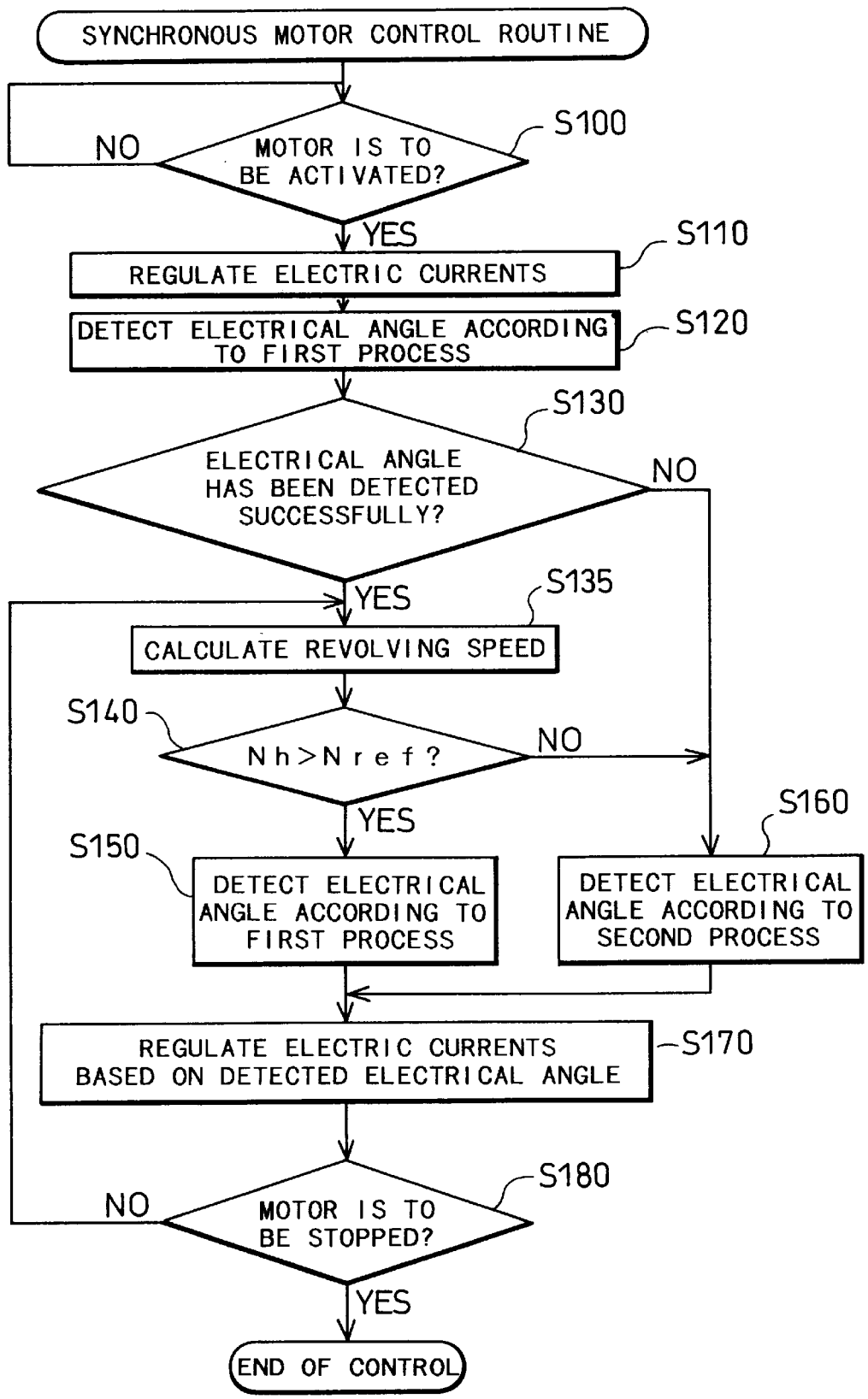
FIG. 5 is a flowchart showing a synchronous motor control routine executed in the first embodiment.

The following describes the first electrical angle detection process, the second electrical angle detection process, and a method of controlling operation of the three-phase synchronous motor 40, together with a start-time control procedure of the three-phase synchronous motor 40. FIG. 5 is a flowchart showing a synchronous motor control routine executed in the first embodiment. When the method enters the routine of FIG. 5, it is first determined whether or not the three-phase synchronous motor 40 is to be activated at step S100. The determination of the activation or non-activation of the three-phase synchronous motor 40 depends upon whether or not a torque command value T* is given externally. In case that the torque command value T* for activating the synchronous motor 40 is not given from outside, the CPU 101 remains on standby. In case that the torque command value T* is externally given to activate the synchronous motor 40, on the other hand, the method proceeds to step S110. The method controls the inverter 110 for the flow of predetermined electric currents at step S110, and subsequently detects the electrical angle θ according to the first process at step S120.

Figure 6:
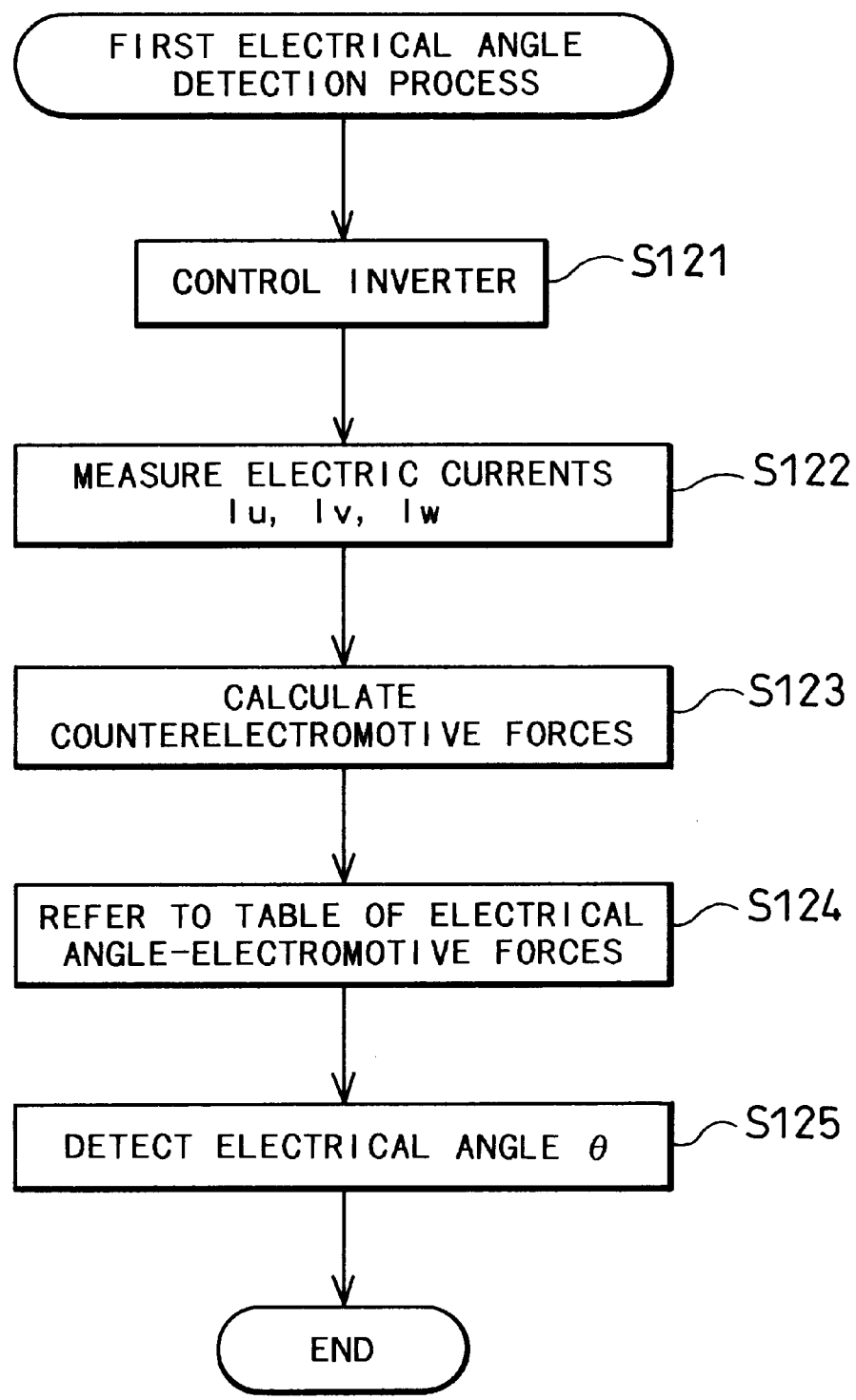
FIG. 6 is a flowchart showing a first electrical angle detection routine executed in the first embodiment.

The first electrical angle detection process is realized by a routine shown in the flowchart of FIG. 6. The first electrical angle detection process determines the electrical angle θ based on counterelectromotive forces of the three-phase synchronous motor 40. As the magnetic field formed by the permanent magnets 51 through 54 shifts or rotates with a rotation of the rotor 50, voltages in the direction reverse to the direction of externally applied voltages are generated in the stator coils 32, which are conductors placed in the magnetic field. These voltages continuously rotate with the rotation of the rotor 50 while keeping the balance with the externally applied voltages. Measurement of these voltages accordingly leads to detection of the electrical angle θ. The counterelectromotive forces follow the Fleming's right-hand rule. It is accordingly difficult to measure the counterelectromotive forces when the magnetic field shifts at a low speed, that is, when the rotor 50 rotates at a low speed. The condition of measurement is accordingly that the rotor 50 rotates at or above the predetermined speed.

The first electrical angle detection process first assumes that the rotor 50 rotates substantially at the predetermined speed, and controls the inverter 110 at step S121 in the flowchart of FIG. 6. The process then reads the signals from the electric current meters 122 through 126 to measure the respective phase currents Iu, Iv, and Iw at step S122. The process subsequently calculates counterelectromotive forces from the observed phase currents at step S123. The counterelectromotive forces are calculated in the following manner. The counterelectromotive forces represent the voltages on the d axis and the q axis and are expressed as the counterelectromotive forces [Ed,Eq]. In order to calculate the counterelectromotive forces [Ed,Eq], the observed electric currents Iu and Iv of the U phase and the V phase are subjected to three phase-to-two phase conversion (three phase-to-dq conversion), which is carried out according to Equation (1) given below. The electrical angle θ used in the calculation of Equation (1) is arithmetically estimated and, for example, applied for the control of the inverter 110 at step S121 in the flowchart of FIG. 6.

$$\begin{bmatrix} Id(n) \\ Iq(n) \end{bmatrix} = \sqrt{2} \begin{bmatrix} \sin(\theta + 120) & -\sin\theta \\ \cos(\theta + 120) & -\cos\theta \end{bmatrix} \begin{bmatrix} Iu(n) \\ Iv(n) \end{bmatrix} \quad (1)$$

where Iu+Iv+Iw=0 and (n) denotes a sampled point at a time point 'n'.

The counterelectromotive forces [Ed,Eq] are then calculated according to Equation (2) given below. The counterelectromotive forces [Ed,Eq] calculated here are counterelectromotive forces on the d and q axes based on the arithmetically estimated electrical angle θ.

$$\begin{bmatrix} Ed \\ Eq \end{bmatrix} = \begin{bmatrix} Vd \\ Vq \end{bmatrix} - \begin{bmatrix} R \cdot Id(n) + L\{Id(n) - Id(n-1)\}/T - \omega L \cdot Iq(n) \\ R \cdot Iq(n) + L\{Iq(n) - Iq(n-1)\}/T - \omega L \cdot Id(n) \end{bmatrix} \quad (2)$$

where T denotes a sampling period, R a resistance of the motor, L an inductance of the three-phase coils, and ω an angular velocity of the motor.

Equation (2) is rewritten as Equations (3) given blow:

$$\begin{bmatrix} Eu \\ Ev \end{bmatrix} = \sqrt{\frac{2}{3}} \begin{bmatrix} \cos\theta & -\sin\theta \\ \cos(\theta - 120) & -\sin(\theta - 120) \end{bmatrix} \begin{bmatrix} Ed \\ Eq \end{bmatrix} \quad (3)$$

$$Ew = -(Eu + Ev)$$

In this manner, counterelectromotive forces Eu, Ev, and Ew are obtained from the observed electric currents Iu and Iv of the U phase and the V phase.

The counterelectromotive forces thus obtained rotate with a rotation of the rotor 50 and thereby vary with an elapse of time. The counterelectromotive forces plotted on the time axis accordingly form sine waves. In this embodiment, the relationship between the electrical angle and the counter-electromotive forces is determined in advance and stored as a table in the ROM 102. The process refers to this table at step S124 and reads the electrical angle θ of the rotor 50 corresponding to the counterelectromotive forces calculated at step S123 from the table at step S125.

As described above, the electrical angle θ can be detected when the revolving speed of the rotor 50 is not less than the predetermined level. When the revolving speed of the rotor 50 is less than the predetermined level, however, the electrical angle θ can not be detected. Referring back to the flowchart of FIG. 5, it is then determined whether or not the electrical angle θ has been detected successfully at step S130. In case that the electrical angle θ has been detected, the method proceeds to step S135. In case that the electrical angle θ has not been detected, on the other hand, the method proceeds to step S160 to detect the electrical angle θ according to the second electrical angle detection process. When the electrical angle θ has been detected successfully, the method calculates a revolving speed Nh of the rotor 50 at step S135. The revolving speed Nh of the rotor 50 is obtained as a rate of change in electrical angle θ per unit time. The calculated revolving speed Nh is compared with a predetermined revolving speed Nref at step S140. When the calculated revolving speed Nh is, greater than the predetermined revolving speed Nref, the method determines that the detection of the electrical angle θ can be continued with the counterelectromotive forces. The method accordingly repeats the detection of the electrical angle θ according to the first electrical angle detection process at step S150 and regulates the respective phase currents of the three-phase synchronous motor 40 based on the detected electrical angle θ at step S170. The first electrical angle detection process applied at step S150 is identical with the first electrical angle detection process applied at step S120 and described with the flowchart of FIG. 6.

When the electrical angle θ has not been detected successfully with the counterelectromotive forces immediately after the activation of the three-phase synchronous motor 40 at step S130 or when the calculated revolving speed Nh of the rotor 50 is not greater than the predetermined revolving speed Nref at step S140, the method detects the electrical angle θ according to the second electrical angle detection process at step S160. The second electrical angle detection process is based on the inductance of the circuit, which depends upon the position of the rotor 50. The following describes the details of the second electrical angle detection process.

Figure 7:
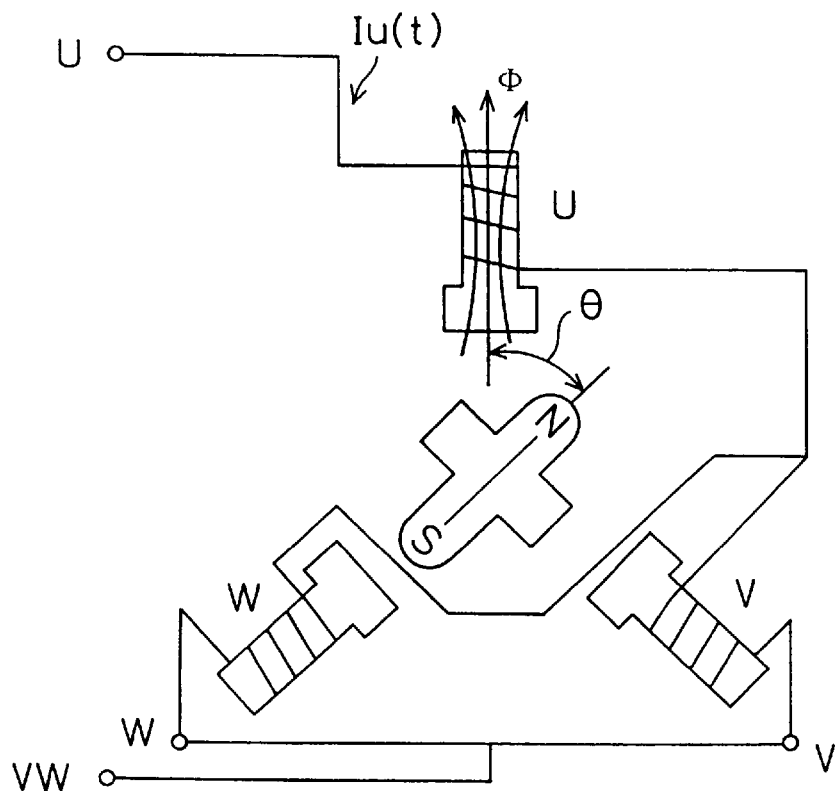
FIG. 7 is a circuit diagram illustrating an equivalent circuit of the three-phase synchronous motor 40 of the first embodiment.
Figure 8:
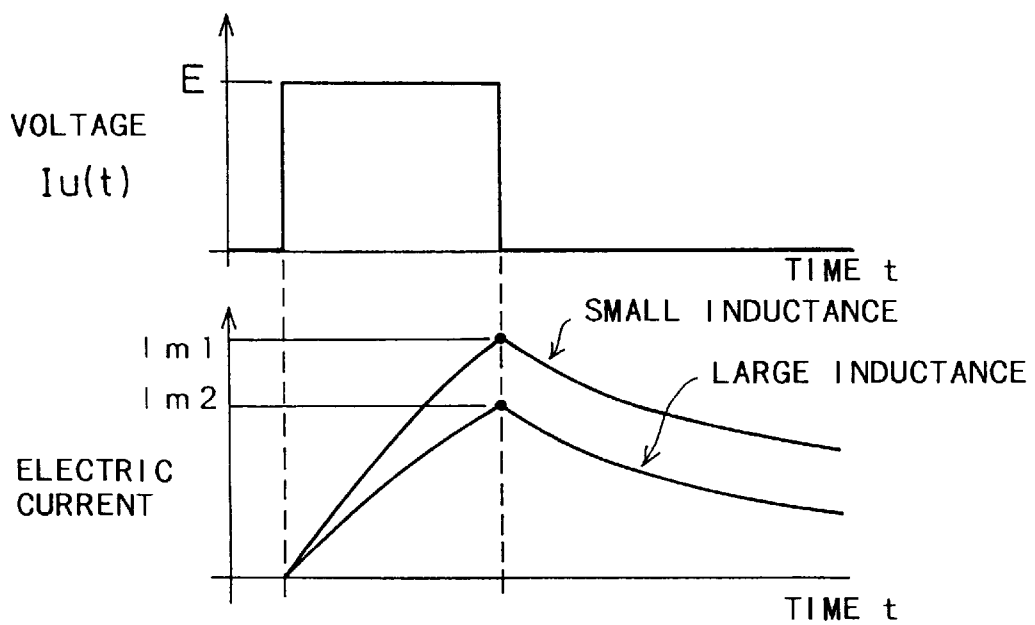
FIG. 8 is a graph showing a transient response of U-phase current Iu(t) when a voltage E1 is applied between the U phase and the VW phase.

FIG. 7 is a circuit diagram illustrating an equivalent circuit of the three-phase synchronous motor 40. When a predetermined voltage E1 is applied between the U phase and the VW phase of the three-phase synchronous motor 40 as a step function, an electric current Iu(t) flowing therethrough shows a transient response, which depends upon an inductance component L of the circuit. Namely a value Im of the electric current at a predetermined time point after application of the voltage is affected by the magnitude of the inductance L of the circuit. FIG. 8 is a graph showing the transient response of the electric current Iu(t). In the actual three-phase synchronous motor 40, the inductance L is a function of the electrical angle θ of the rotor 50 at the moment. When a predetermined voltage is applied between specific windings for a predetermined time, each phase current flowing therethrough has an intrinsic value according to the electrical angle.

Figures 9, 10:
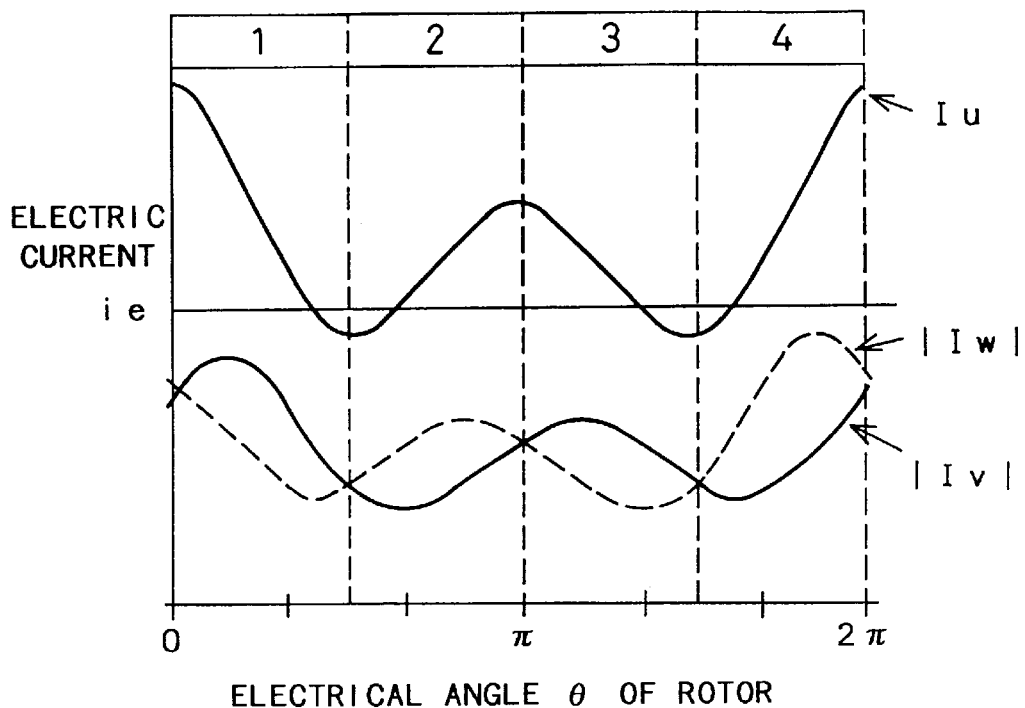
FIG. 9 is a graph showing the phase currents Iu, Iv, and Iw plotted against the electrical angle θ.
FIG. 10 is a map showing the relationship between each combination of phase currents and the electrical angle θ.

The electric current Iu(t) flowing through the equivalent circuit shown in FIG. 7 (hereinafter referred to as the U-phase current) shows a response defined by Equation (4) given below:

$$Iu(t) = \{1 - \exp(-Rt/L)\}E1/R \quad (4)$$

where exp( ) denotes an exponential function, R an impedance of the circuit, and t a time. The U-phase current Iu(t) increases slowly in the case of the large inductance L. Measurement of the electric current at a predetermined time point after application of the voltage leads to determination of the electrical angle θ as the function of the inductance L as mentioned above. The respective phase currents were measured against the electrical angle θ. The results of measurement are shown in the graph of FIG. 9. FIG. 9 shows curves of the respective phase currents when a voltage is applied between the U phase and the VW phase as shown in FIG. 7 and large electric currents are flown to magnetically saturate the coils. The electric currents Iu, |Iv|, and |Iw| were measured by the electric current meters 122 through 126. These measurement values Iu, |Iv|, and |Iw| cause magnetic saturation and are thereby unsymmetrical. The electrical angle θ can thus be clearly determined from these measurement values, except in the range where the U-phase current Iu is less than a predetermined value ie. FIG. 10 is a map showing the relationship between each combination of the phase currents Iu, |Iv|, and |Iw| and the electrical angle θ. The procedure of this embodiment prepares a map showing this relationship in advance and stores the map in the ROM 102.

Figure 11:
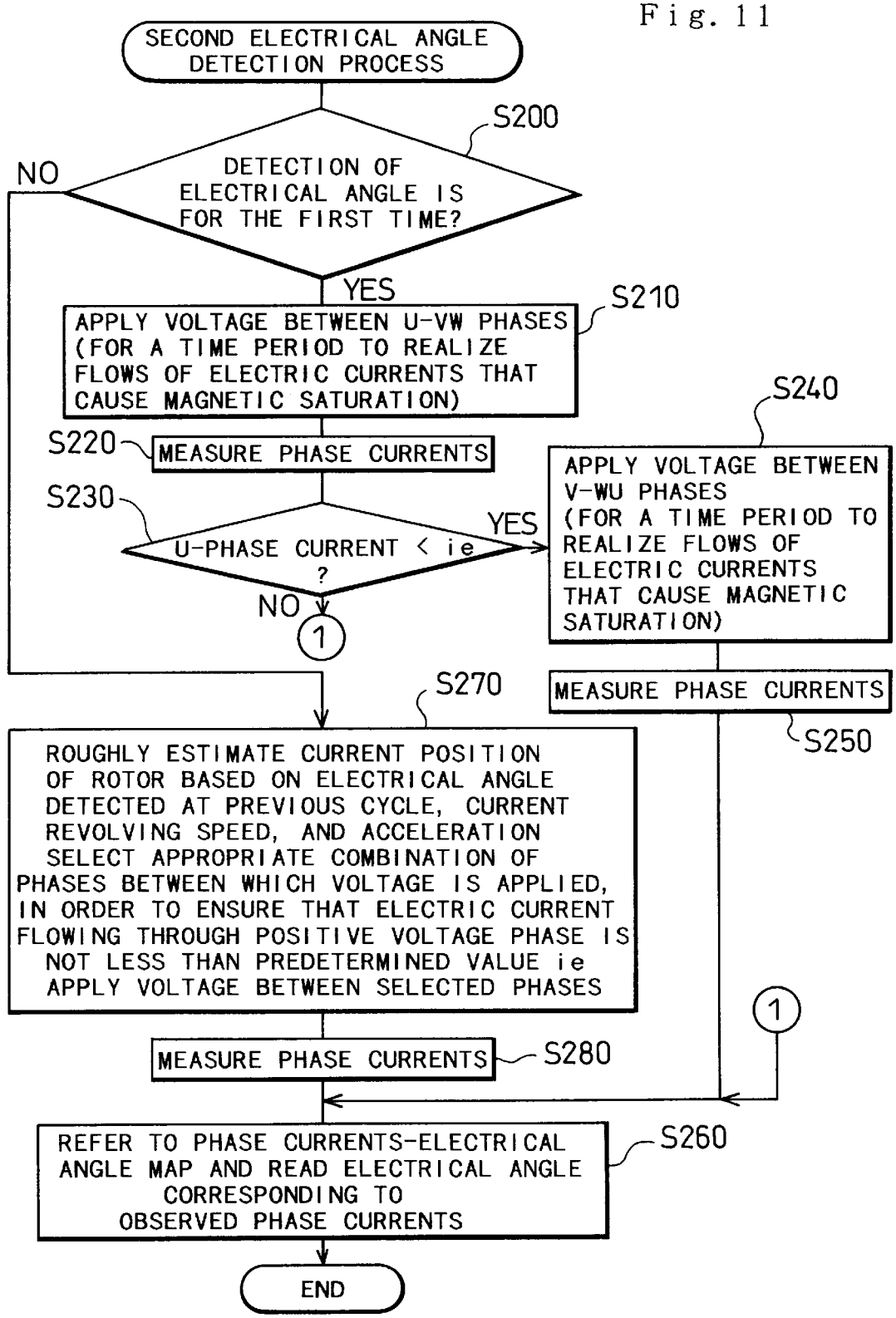
FIG. 11 is a flowchart showing a second electrical angle detection routine executed in the first embodiment.

As discussed above, the procedure of applying a voltage between the U phase and the VW phase and measuring the electric currents flowing through the respective phases enables the electrical angle θ to be detected accurately, except in the range where the U-phase current Iu is less than the predetermined value ie. The following describes the second electrical angle detection process executed by the CPU 101 of the first embodiment. FIG. 11 is a flowchart showing the second electrical angle detection process executed in the first embodiment. Prior to the execution of this processing routine, the voltage E1, which will be applied between the windings in this processing routine, is applied between the windings of the three-phase synchronous motor 40, and each combination of electric currents flowing through the coils of the U, V, and W phases and the corresponding electrical angle θ are measured. A map as shown in FIG. 10 is prepared and stored in the ROM 102 that is connected to the CPU 101.

The CPU 101 repeatedly executes the second electrical angle detection routine shown in the flowchart of FIG. 11 at predetermined intervals that are shorter than a time period required for a variation of the electrical angle from 0 to $\pi$ at the predetermined revolving speed Nref. By way of example, when the predetermined revolving speed Nref is set equal to 100 rpm, the shortest time period required for one revolution of the rotor 50 is approximately 600 milliseconds, and the time period required for the variation of the electrical angle from 0 to $\pi$ is approximately 150 milliseconds. In this embodiment, the CPU 101 executes the processing routine of FIG. 11 at every 5 milliseconds by taking advantage of the time interruption.

Figure 12:
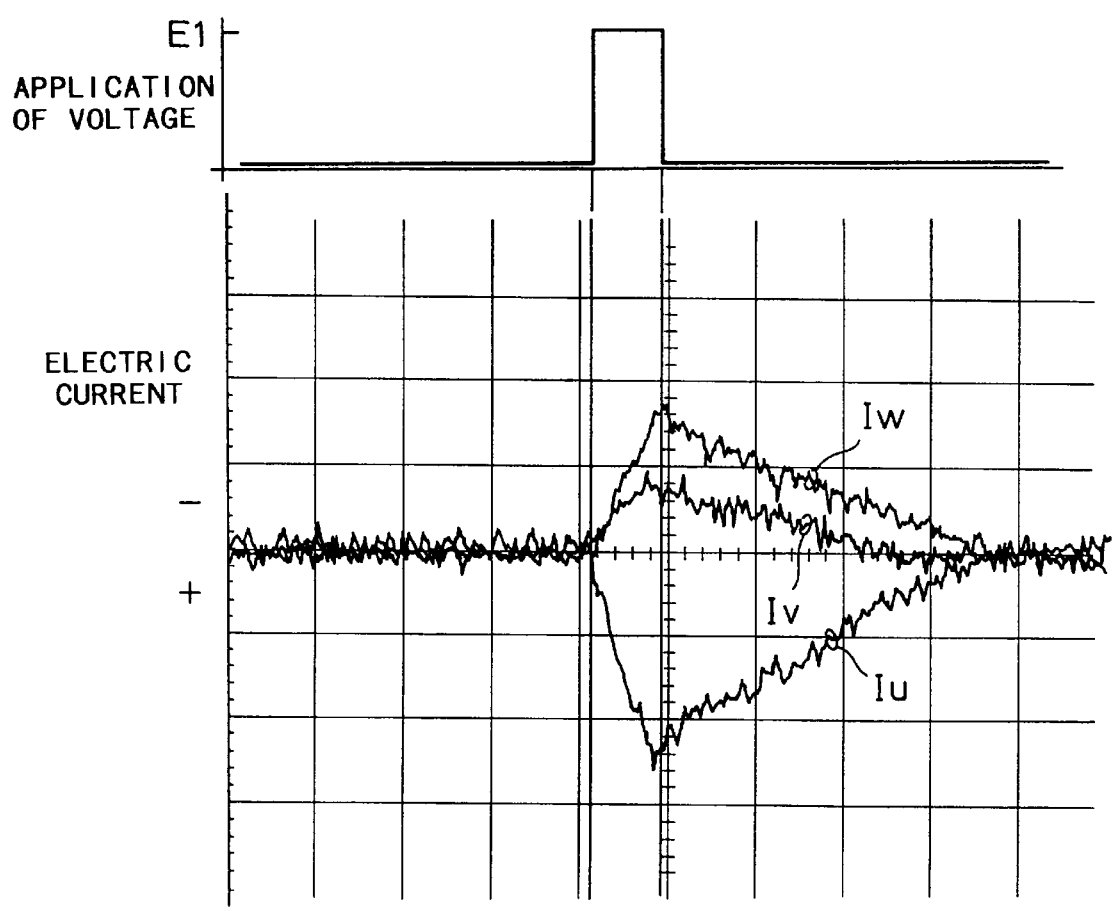
FIG. 12 is a graph showing phase currents in response to application of a voltage E1.

When the process enters the routine of FIG. 11, the CPU 101 determines whether or not detection of the electrical angle θ is carried out for the first time at step S200. Once the electrical angle θ is detected, the position of the rotor 50 can be estimated roughly at a next cycle of detection. The position of the rotor 50 is, however, completely unknown and can not be estimated even roughly at a first cycle of detection. The procedure taken here accordingly depends upon whether or not detection of the electrical angle θ is carried out for the first time. When it is determined at step S200 that detection of the electrical angle is carried out for the first time, a predetermined voltage E1 is applied between the U phase and the VW phase of the windings at step S210. The magnitude of the applied voltage E1 is specified in advance to realize flows of the electric currents that cause magnetic saturation of the coils, and is identical with the magnitude of the voltage used for preparation of the map as shown in FIG. 10. Application of the voltage between the U phase and the VW phase causes the electric currents to flow through the windings of the respective phases according to the inductance. The process accordingly measures the electric currents of the respective phases with the electric current meters 122 through 126 at step S220. FIG. 12 is a graph showing the electric currents flowing through the respective phases when a voltage is applied between the U phase and the VW phase. In case that the voltage E1 is applied as a step function, the electric currents increase over the period of the application. The electric currents gradually decrease after the application of the voltage stops. Measurement is carried out immediately before the stop of the application of the voltage E1.

The process then proceeds to step S230, at which the U-phase current Iu among the observed three phase currents is compared with the predetermined value ie shown in the graph of FIG. 9. As described previously, the accuracy of detection of the electrical angle θ is not sufficiently high in the range where the electric current of the coil that receives application of a positive voltage is less than the predetermined value ie. When the electric current flowing through the coil having application of a positive voltage is less than the predetermined value ie at step S230, the process applies the predetermined voltage E1 between the V phase and the WU phase at step S240, and measures the phase currents at step S250. In the three-phase synchronous motor 40, the U–VW phases and the V–WU phases are electrically equivalent to each other. When the voltage is applied between the V phase and the WU phase, the relationship between the electrical angle θ and the respective phase currents corresponds to the data in the graph of FIG. 9 shifted by 120 degrees (2π/3). In case that the U-phase current Iu is not less than the predetermined value ie at step S230, on the other hand, the process skips the processing of steps S240 and S250.

After the electric currents Iu, Iv, and Iw flowing through the respective phase coils in response to application of the predetermined voltage E1 are measured with the electric current meters 122 through 126 and read via the ADCs 132 through 136, the process refers to the map showing the relationship between each combination of the phase currents and the electrical angle θ as shown in FIG. 10 and reads the electrical angle θ corresponding to the observed electric currents Iu, Iv, and Iw at step S260. When a positive voltage is applied to the U phase, negative currents actually flow through the V phase and the W phase as shown in the graph o FIG. 12. The map of FIG. 10 accordingly includes the absolute values |Iv| and |Iw| of the observed electric currents Iv and Iw.

In this embodiment, the magnitude of the voltage E1 applied between the U phase and the VW phase is specified to cause flows of electric currents to magnetically saturate the respective phase coils. The electric currents flowing through the respective coils are accordingly not symmetrical in the range of the electrical angle of 0 to $\pi$ and in the range of $\pi$ to $2\pi$ as shown in the graph of FIG. 9. As long as the electric current flowing through the phase having application of a positive voltage is not less than the predetermined value ie, this process unequivocally determines the electrical angle θ from the observed phase currents. After referring to the map of FIG. 10 and determining the electrical angle θ at step S260, the process goes to END and exits from this routine.

When it is determined at step S200 that detection of the electrical angle has already been carried out, the process proceeds to step S270 to carry out the following processing and apply the voltage between specific phases. When the electrical angle has been detected at a previous cycle, the CPU 101 receives data representing the current revolving speed of the synchronous motor 40 (that is, the reciprocal of a variation in electrical angle θ in a predetermined time period) and the acceleration of the revolution (that is, the differential of the revolving speed). In accordance with a concrete procedure of step S270, the process roughly estimates the position of the rotor 50 based on these pieces of information and determines whether or not there is a possibility that the electric current flowing through the coil having application of a positive voltage is less than the predetermined value ie. If there is no such a possibility, the voltage E1 is applied between the phases selected previously. If there is a possibility that the electric current flowing through the coil having application of a positive voltage is less than the predetermined value ie, on the other hand, the process changes the combination of the phases, between which the voltage is applied, and applies the voltage E1 between the newly selected phases. The phase currents generating in response to application of the voltage E1 are then measured with the electric current meters 122 through 126 at step S280. The decision at step S270 and the measurement of the respective phase currents at step S280 are equivalent to the processing of steps S210 through S250 based on the theoretical possibility.

After the processing of step S280, the process refers to the map of FIG. 10 and reads the electrical angle θ corresponding to the observed phase currents at step S260. In this manner, the electrical angle θ is detected according to the second electrical angle detection process.

Referring back to the flowchart of FIG. 5, after the electrical angle θ is detected according to the first electrical angle detection process at step S150 or after the electrical angle θ is detected according to the second electrical angle detection process at step S160, the method proceeds to step S170. The method controls the inverter 110 with the detected electrical angle θ, so as to cause the required electric currents to flow through the stator coils 32 of the respective phases of the three-phase synchronous motor 40 at step S170. The required phase currents are known according to the externally input torque command value T* and the detected electrical angle θ, and are converted to information on the pulse width. Signals Vu, Vv, and Vw are output via the output port 107, in order to keep on the respective high-power switching transistors of the main drive circuit 114 of the inverter 110 for a required time period. The inverter 110 receives these signals Vu, Vv, and Vw via the interface unit 112 and drives the main drive circuit 114 via the pre-drive circuits 116 and 118.

The detection of the electrical angle θ according to either the first electrical angle detection process or the second electrical angle detection process and the regulation of the respective phase currents of the stator coils 32 based on the detected electrical angle θ are repeatedly performed (steps S135 through S170) until it is determined at step S180 that an instruction is given to stop operation of the synchronous motor 40. The instruction to stop the synchronous motor 40 is equivalent to the torque command value T* set equal to zero. In one preferred structure, the predetermined revolving speed Nref, which is compared with the calculated revolving speed Nh of the rotor 50 to select the appropriate electrical angle detection process, may be incremented by a preset value, in case that the second electrical angle detection process is selected. The structure of setting the hysteresis effectively prevents hunting of the control.

When the torque command value T* is externally given to activate the three-phase synchronous motor 40, the control procedure discussed above first assumes that the revolving speed of the three-phase synchronous motor 40 is greater than the predetermined revolving speed Nref, and carries out detection of the electrical angle θ according to the first electrical angle detection process. In case that the electrical angle θ has not been detected successfully, the program determines that the revolving speed of the three-phase synchronous motor 40 is rather low, and carries out detection of the electrical angle θ according to the second electrical angle detection process. Even when the three-phase synchronous motor 40, which is activated in response to the externally input torque command value T*, is rotated by an external device connected to its rotating shaft 55, this structure accurately detects the electrical angle θ of the three-phase synchronous motor 40 within a short time period and adequately controls operation of the three-phase synchronous motor 40. The second electrical angle detection process is applied in the case where the rotor 50 is at a stop or rotates at a sufficiently low speed and supposing that counterelectromotive forces do not exist. In case that the counterelectromotive forces are induced to the stator coils 32 by a rotation of the rotor 50, the second electrical angle detection process may cause inaccurate detection of the electrical angle θ. The procedure of the first embodiment, however, detects the electrical angle based on the counter-electromotive forces at the time of starting operation of the three-phase synchronous motor 40. This structure ascertains accurate detection of the electrical angle θ. When the rotor 50 rotates at a low speed, the procedure of the embodiment can not simply detect the electrical angle θ.

Figure 13:
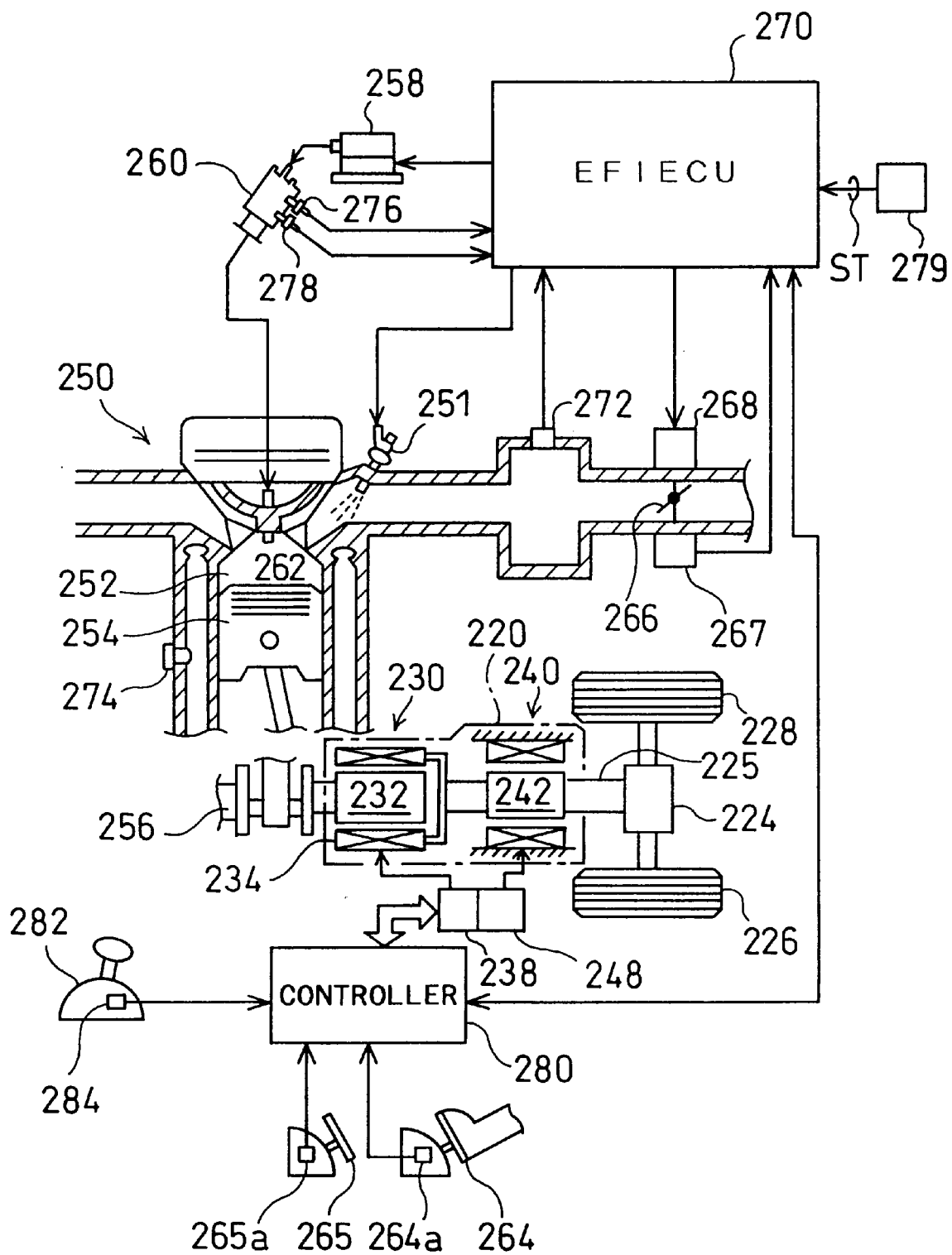
FIG. 13 schematically illustrates a power transmission system of a hybrid vehicle with the motor control apparatus of the first embodiment incorporated therein.

In some applications, the rotor 50 of the three-phase synchronous motor 40 rotates at an appreciable revolving speed, prior to a start of operation of the three-phase synchronous motor 40. FIG. 13 shows an example of such applications. In this example, two motors (clutch motor and assist motor) 230 and 240 are attached in series to a crankshaft 256, which is an output shaft of an engine 250. Power is transmitted between the engine 250 and a drive shaft 225 connected to driving wheels 226 and 228. Although a detailed driving circuit is not illustrated here, these two motors 230 and 240 are combined with each other to constitute a power transmission apparatus 220, which transmits power while carrying out torque conversion. FIG. 13 schematically illustrates a power system of a hybrid vehicle. The engine 250 mounted as a power source on the vehicle is a gasoline engine driven by means of gasoline. In the engine 250, the air ingested from an air intake system via a throttle valve 266 is mixed with a supply of gaseous fuel injected from a fuel injection valve 251. The air/fuel mixture is fed to a combustion chamber 252 to be exploded in the combustion chamber 252. Motions of a piston 254 pressed down by the explosion of the air/fuel mixture are converted to rotational motions of the crankshaft 256. The throttle valve 266 is driven to open and close by a motor 268. An ignition plug 262 receives a high voltage applied from an igniter 258 via a distributor 260 and generates an electric spark, which ignites the air/fuel mixture for explosion and combustion thereof.

Operation of the engine 250 is controlled by an electronic control unit (hereinafter referred to as EFIECU) 270. A variety of sensors showing the driving state of the engine 250 are connected to the EFIECU 270. Examples of such sensors include a throttle position sensor 267 that measures the position of the throttle valve 266, an intake manifold negative pressure sensor 272 that measures a loading applied to the engine 250, a water temperature sensor 274 that measures the water temperature in the engine 250, and a speed sensor 276 and an angle sensor 278 that are placed in the distributor 260 to measure the revolving speed and the rotational angle of the crankshaft 256. A starter switch 279 for detecting a state ST of an ignition key is also connected to the EFIECU 270. Other sensors and switches connected to the EFIECU 270 are omitted from the illustration of FIG. 13.

The crankshaft 256 of the engine 250 is linked with the drive shaft 225 via the power transmission apparatus 220. The drive shaft 225 is connected to a differential gear 224, so that a torque output from the drive shaft 225 is eventually distributed into and transmitted to the left and the right driving wheels 226 and 228. The power transmission apparatus 220 is controlled by a controller 280 including a control CPU. A shift position sensor 284 mounted on a gearshift lever 282, an accelerator pedal position sensor 264a that detects a step-on amount of an accelerator pedal 264, and a brake pedal position sensor 265a that detects a step-on amount of a brake pedal 265 are connected to the controller 280. The controller 280 transmits and receives various pieces of information to and from the EFIECU 270 through communication.

The clutch motor 230 of the power transmission apparatus 220 includes an inner rotor 232 that is connected to the crankshaft 256 and an outer rotor 234 that has three-phase coils wound thereon (which corresponds to the stator 30 of the three-phase synchronous motor 40 discussed above) but is rotatable. The outer rotor 234 is linked with a rotor 242 of the assist motor 240, which is connected to the drive shaft 225. The clutch motor 230 and the assist motor 240 are respectively connected to inverters 238 and 248, which are controlled by the controller 280 and transmit and receive the electric power to and from the clutch motor 230 and the assist motor 240. For example, regulating the electric currents flowing through the three-phase coils of the outer rotor 234 of the clutch motor 230 controls the degree of electromagnetic coupling of the inner rotor 232 with the outer rotor 234 in the clutch motor 230. Control of the inverter 238 accordingly enables part of the output of the engine 250 to be transmitted to the drive shaft 225 via the clutch motor 230, while the remaining energy is taken as electrical energy out of the clutch motor 230 via the inverter 238. Part of the output energy of the engine 250 taken out of the clutch motor 230 in the form of electricity may be stored in a battery (not illustrated) or used directly to drive the assist motor 240. In this case, the assist motor 240 applies a torque to the drive shaft 225. The output energy of the engine 250, which is defined by the revolving speed×the torque of the crankshaft 256, is thus output to the drive shaft 225 as energy defined by a lower revolving speed×a higher torque than those of the crankshaft 256. Reverse conversion of energy is also possible. The power transmission apparatus 220 regulates the input and output of the electric power between the clutch motor 230 and the inverter 238 and the input and output of the electric power between the assist motor 240 and the inverter 248. The output power of the engine 250 is accordingly converted appropriately and transmitted to the drive shaft 225. Another driving mode may be applied at the time when a braking force is applied or when the vehicle drives down a slope. In this driving mode, whereas the engine 250 stops, the assist motor 240 collects the inertial energy of the vehicle that continues driving.

Under certain conditions, during a drive of the vehicle of the above structure, while the clutch motor 230 or the assist motor 240 is not driven, its rotor revolves. By way of example, it is assumed that the assist motor 240 in this state is required to apply a torque and is thus activated by the controller 280. In this case, the first electrical angle detection process is adopted first to detect the electrical angle with the counterelectromotive forces. The appropriate electrical angle detection process is selected according to the result of the detection, in order to ascertain accurate detection of the electrical angle. In another example, while the clutch motor 230 is at an idle and the engine 250 is at a stop during a drive of the vehicle, it is required to generate the electromagnetic coupling of the inner rotor 232 with the outer rotor 234 in the clutch motor 230 and crank the crank shaft 256. In this state, the method of the embodiment starts detection of the electrical angle according to the first electrical angle detection method based on the counterelectromotive forces. This also ascertains accurate detection of the electrical angle.

Figure 14:
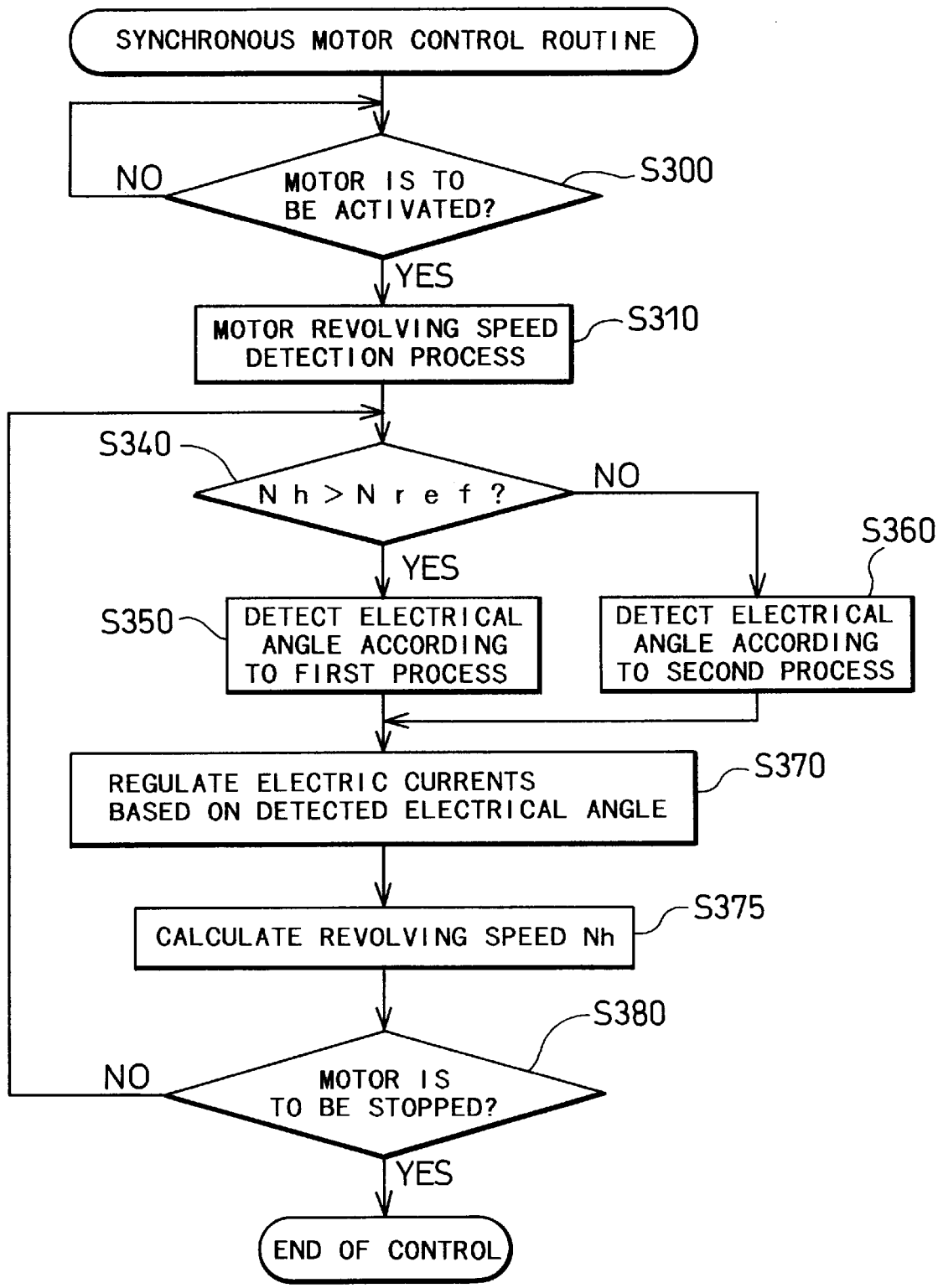
FIG. 14 is a flowchart showing a synchronous motor control routine executed in a second embodiment according to the present invention.

The following describes a second embodiment according to the present invention. A motor control apparatus of the second embodiment has an identical hardware structure with that of the first embodiment but applies a different method to detect the electrical angle at the time of starting the three-phase synchronous motor 40. FIG. 14 is a flowchart showing a synchronous motor control routine of the second embodiment. The control routine of the second embodiment shown in the flowchart of FIG. 14 corresponds to the control routine of the first embodiment shown in the flowchart of FIG. 5. The processing of step S340 and subsequent steps in FIG. 14 except step S375 is substantially identical with the processing of step S140 and subsequent steps in FIG. 5. The primary difference between the control routines of the first embodiment and the second embodiment is that the method of the first embodiment detects the electrical angle according to the first electrical angle detection process after a start of the three-phase synchronous motor 40 and calculates the revolving speed of the rotor 50 from the observed electrical angle, whereas the method of the second embodiment detects the revolving speed of the rotor 50 independently of the observed electrical angle. The following describes the synchronous motor control routine of the second embodiment, especially the difference from the first embodiment.

When the method enters the processing routine of FIG. 14, the CPU 101 remains on standby until an instruction is given to activate the three-phase synchronous motor 40 at step S300. In response to an instruction to activate the three-phase synchronous motor 40, the method carries out a motor revolving speed detection process to detect a revolving speed Nh of the rotor 50 at step S310, which will be described later. The detected revolving speed Nh of the rotor 50 is then compared with a predetermined revolving speed Nref at step S340. Like the method of the first embodiment, when the revolving speed Nh of the rotor 50 is greater than the predetermined revolving speed Nref, the first electrical angle detection process is adopted to detect the electrical angle θ at step S350. When the revolving speed Nh is not greater than the predetermined revolving speed Nref, on the other hand, the second electrical angle detection process is applied to detect the electrical angle θ at step S360. The respective phase currents of the three-phase synchronous motor 40 are regulated with the detected electrical angle θ at step S370. The method subsequently proceeds to step S375, at which the revolving speed Nh of the rotor 50 is calculated from the detected electrical angle θ at step S375. Unlike the detection of the revolving speed Nh at step S310, the processing of step S375 simply calculates the revolving speed Nh from a variation in electrical angle θ per unit time. The processing of steps S340 through S375 is repeatedly executed until an instruction is given to stop the three-phase synchronous motor 40 at step S380.

Figure 15:
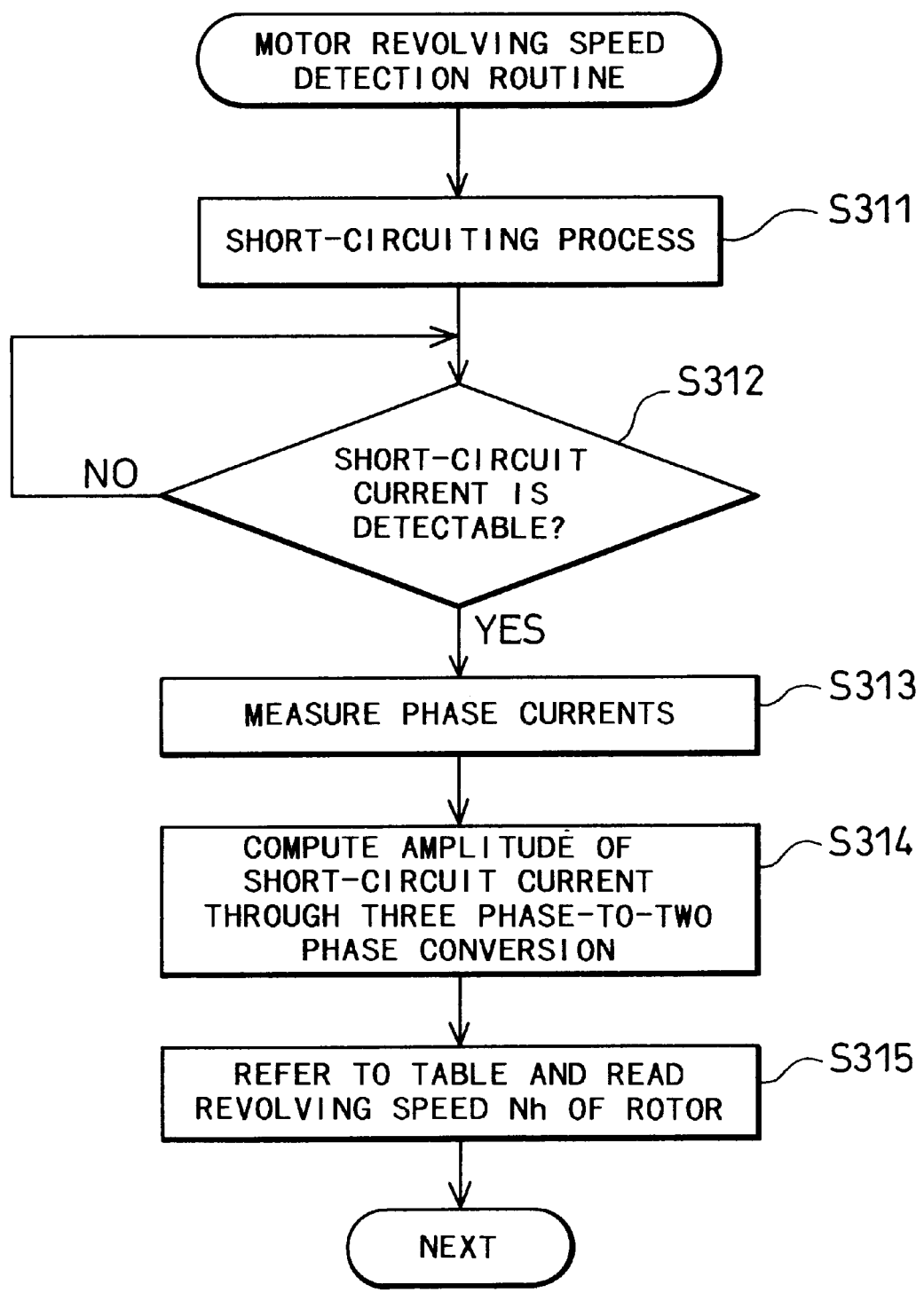
FIG. 15 is a flowchart showing a motor revolving speed detection routine.

FIG. 15 is a flowchart showing details of the motor revolving speed detection process of step S310 carried out immediately after a start of the three-phase synchronous motor 40. When the process enters the routine of FIG. 15, a short-circuiting process is carried out to establish a short circuit in the inverter 110 at step S311. A concrete procedure of step S311 outputs a signal to turn on all the switching transistors on the side of the source of the main drive circuit 114 in the inverter 110 (that is, on the side driven by the pre-drive circuit 116). Alternatively, a signal may be output to turn on all the switching transistors on the side of the drain (that is, on the side driven by the pre-drive circuit 118).

When all the switching elements either on the side of the source or on the side of the drain are turned on, the respective windings are all short-circuited. In case that the rotor 50 rotates in this state, a short-circuit current flows through the respective windings. The CPU 101 then waits for detection of the short-circuit current at step S312. The waiting step is generally realized by waiting for a predetermined period. After elapse of the predetermined period, the CPU 101 reads the outputs of the electric current meters 122 through 126 via the input port 106 to measure phase currents Iu, Iv, and Iw at step S313. The process subsequently computes an absolute value of the short-circuit current or an amplitude |I| of the short-circuit current from the observed electric currents Iu, Iv, and Iw through a three phase-to-two phase conversion at step S314. The three phase-to-two phase conversion is equivalent to calculation according to Equation (5) given below:

$$|I| = \sqrt{Iu^2 + Iv^2 + Iw^2 - IuIv - IvIw - IwIu} \tag{5}$$

The amplitude |I| of the short-circuit current is obtained by Equation (5) because of the following reason. As is known, when the three phase-to-two phase conversion is carried out to convert the observed phase currents Iu, Iv, and Iw into electric currents Id and Iq of the axis d and the axis q, the following equations are satisfied:

$$Id = Iu - Iv/2 - Iw/2$$

$$Iq = \sqrt{3} \cdot (Iv - Iw)/2$$

$$Iw = -Iu - Iv$$

Equation (5) given above to determine the amplitude |I| of the short-circuit current is led by utilizing these relations and the equation of $|I| = (Id^2 + Iq^2)^{+hu} 1/2$.

Figure 16:
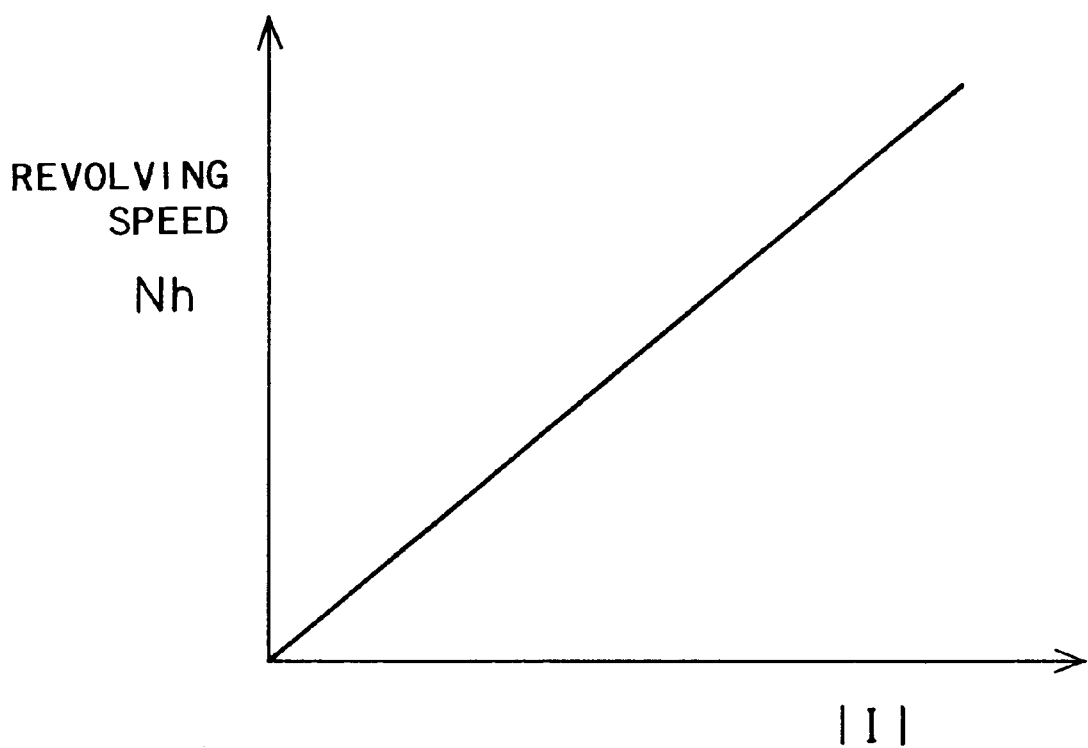
FIG. 16 is a graph showing the relationship between the amplitude |I| of the short-circuit current and the revolving speed Nh of the rotor 50 used in the motor revolving speed detection routine of FIG. 15.

After the computation of the amplitude |I| of the short-circuit current, the revolving speed Nh of the rotor 50 is determined according to the computed amplitude |I| at step S315. There is one-to-one mapping of the amplitude |I| of the short-circuit current onto the revolving speed Nh of the rotor 50 as shown in the graph of FIG. 16. It is accordingly easy to determine the revolving speed Nh of the rotor 50 according to the amplitude |I| of the short-circuit current. The short-circuit time is as short as 1/100 to 1/10 an electrical time constant L/R of the three-phase synchronous motor 40 (where L denotes an inductance of the three-phase coils and R denotes a resistance of the motor). Namely the short-circuit current does not substantially affect rotation of the three-phase synchronous motor 40.

As discussed above, the method of the second embodiment detects the revolving speed Nh of the rotor 50 with the short-circuit current prior to detection of the electrical angle, immediately after a start of the three-phase synchronous motor 40. The method then selects the appropriate electrical angle detection process based on the magnitude of the detected revolving speed Nh and carries out the actual detection of the electrical angle and regulation of the phase currents based on the detected electrical angle. Even when the rotor 50 has already been rotated by an external force or inertia at the time of starting the three-phase synchronous motor 40, the method of the second embodiment enables accurate detection of the electrical angle and adequate regulation of the driving current in the three-phase synchronous motor 40.

A variety of other techniques may be applied for the first electrical angle detection process and the second electrical angle detection process in the first and the second embodiments. Some examples of the available techniques are given below.

First Electrical Angle Detection Process

Figure 17:
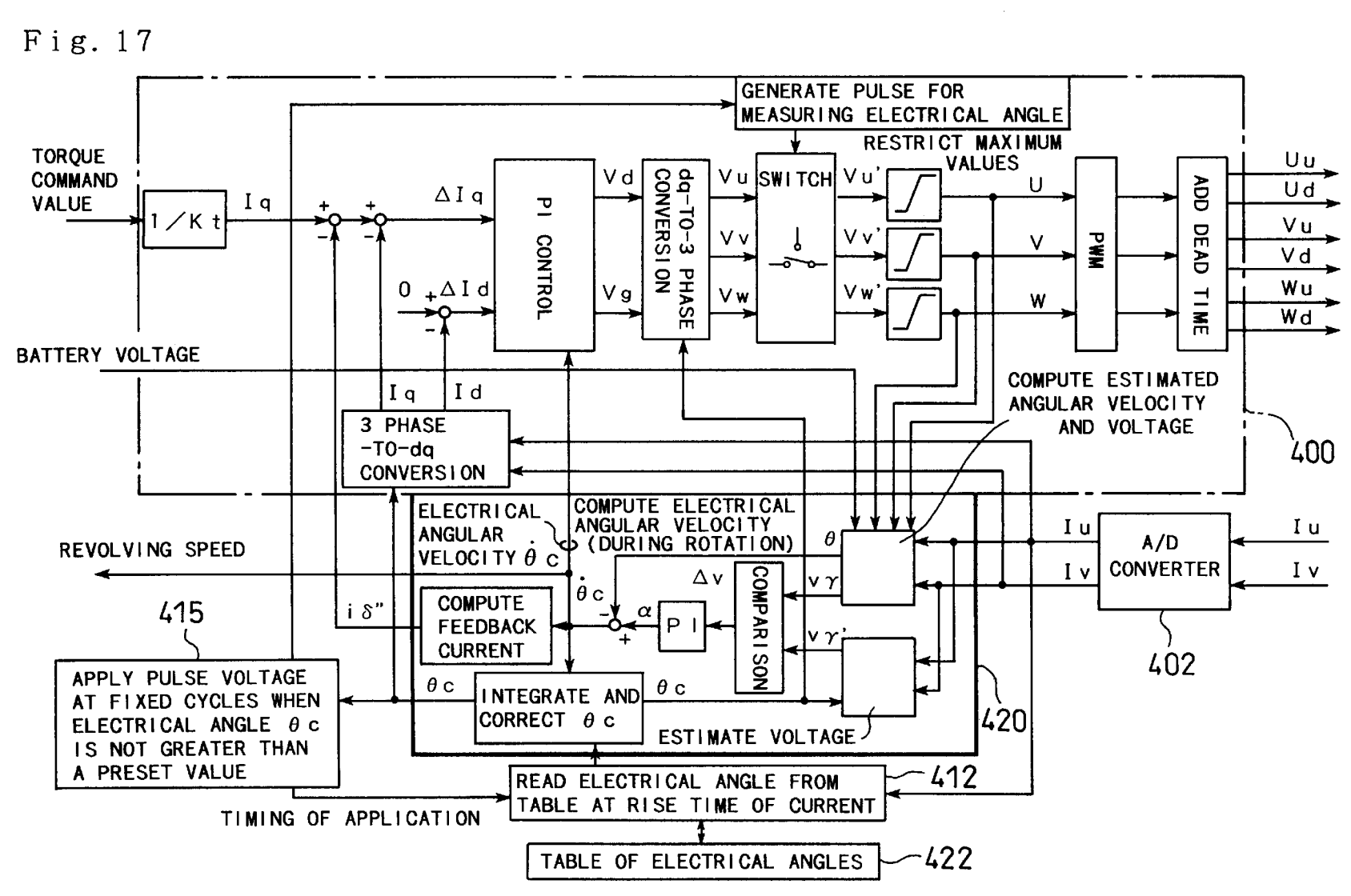

Any technique may be applied for the first electrical angle detection process as long as it has a practical accuracy when the rotor rotates at or above a predetermined speed. In the first and the second embodiments discussed above, the first electrical angle detection process detects the electrical angle θ based on the counterelectromotive forces. Another known technique detects the electrical angle θ based on a motor model. FIG. 17 is a circuit diagram schematically illustrating a motor current control circuit 400 with a circuit for detecting the electrical angle θ based on the motor model according to the first electrical angle detection process and a circuit for detecting the electrical angle θ based on the inductance of three-phase coils according to the second electrical angle detection process.

Referring to FIG. 17, the motor current control circuit 400 converts U-phase and V-phase currents read as digital data from an A/D converter 402 into data of the axes d and q, carries out proportional-integral (PI) control based on the data of the d and q axes and an input torque command value, and converts the results of the PI control into signals of the U, V, and W phases. The motor current control circuit 400 then re-converts the signals of the U, V, and W phases into voltage signals, applies pulse width modulation, adds a dead time, and outputs the results to the windings of the three-phase synchronous motor 40.

When the rotor 50 rotates at or above a predetermined revolving speed, a first electrical angle computation unit 420 computes the electrical angle θ. The first electrical angle computation unit 420 computes an estimated angular velocity, which is the differential of the electrical angle θ, from the observed phase currents Iu and Iv and the voltages of the U, V, and W phases in the motor current control circuit 400. The first electrical angle computation unit 420 also computes a voltage signal vγ in the direction of the axis γ, and carries out PI control on a difference Δγ of the voltage signal γ from an estimated voltage vγ' estimated from the observed phase currents Iu and Iv. The first electrical angle computation unit 420 then determines an electrical angular velocity based on the sign of the estimated angular velocity, calculates a feedback current with the electrical angular velocity, and outputs the feedback current to the motor current control circuit 400. The first electrical angle computation unit 420 detects the electrical angle (the electrical angular velocity in this case) in the above manner when the rotor 50 rotates at or above the predetermined revolving speed. The electrical angular velocity is integrated and output as an electrical angle signal to a circuit for converting the three-phase signals into the signals of the d and q axes and a circuit for applying a pulse voltage at predetermined cycles in case that the revolving speed of the rotor 50 is less than the predetermined revolving speed.

When the rotor 50 is at a stop or rotates at a speed less than the predetermined revolving speed, on the other hand, the electrical angle θ is computed from the observed phase currents Iu and Iv. In this case, a second electrical angle computation unit 412 refers to an electrical angle table 422, detects the electrical angle θ based on the inductance, and outputs an electrical angle signal. Either one of the electrical angle signals output from the first electrical angle computation unit 420 and the second electrical angle computation unit 412 is alternatively selected according to the revolving speed of the rotor 50. The selected electrical angle signal is used to control the driving current of the three-phase synchronous motor 40.

In another example, a speed sensor mounted on the outer circumference of the rotating shaft 55 may be used for the first electrical angle detection process. The speed sensor may consist of permanent magnets attached to the rotating shaft 55 and hole elements mounted on the outer circumference of the rotating shaft 55. The speed sensor attached to the rotating shaft 55 outputs only one pulse per each rotation of the rotating shaft 55. The speed sensor can thus not be used for detection of the electrical angle when the revolving speed is rather low. In case that the revolving speed of the rotor 50 is not less than the predetermined revolving speed, however, appropriate division of the pulse interval enables estimation of the electrical angle. The moment of inertia depending upon the weight exists on the rotor 50. It is accordingly impossible to vary the revolving speed of the motor discontinuously under the normal driving conditions. It can thus be assumed that the revolving speed of the motor varies continuously. When the revolving speed of the rotor 50 is not less than the predetermined revolving speed, the current electrical angle can be detected based on the signal output from the speed sensor.

Second Electrical Angle Detection Process

Any technique may be applied for the second electrical angle detection process as long as it has a practical accuracy when the rotor rotates at a speed less than the predetermined revolving speed. In the first and the second embodiments discussed above, the second electrical angle detection process detects the electrical angle θ by taking advantage of a variation in inductance of the windings.

There are a number of variations in the electrical angle detection process with the inductance. JAPANESE PATENT LAID-OPEN GAZETTE No. 7-177788, for example, discloses a number of available techniques, which are all applied for the second electrical angle detection process. Other known techniques are also applicable as the electrical angle detection process with the inductance of the windings. For example, in the above embodiments, the magnitude of the voltage applied between the specific phases is set to realize magnetic saturation of the coils, so that the relationship between the electrical angle and the phase currents (inductance) are made unsymmetrical in the range of the electrical angle of 0 to π and in the range of π to 2π. Another available technique utilizes a linear portion of each phase current. A concrete procedure sets the magnitude of the applied voltage for the flow of electric current that does not cause magnetic saturation. The procedure then measures the electrical angle either in the range of 0 to π or in the range of π to 2π, and carries out additional measurement or computation, in order to determine which range the electrical angle θ exists (either the range of 0 to π or the range of π to 2π). Still another available technique measures the phase currents to detect the electrical angle while the driving current of the synchronous motor is temporarily kept off. Another available technique superposes a measurement current on the driving current and eliminates the effect of the driving current measured in advance, so as to determine the electrical angle. The following describes a technique of detecting the electrical angle in two separate steps as the representative of these available techniques. In the description below, φ denotes an electrical angle specified either in the range of 0 to π or in the range of π to 2π, whereas θ denotes an electrical angle unequivocally specified in the range of 0 to 2π.

Figure 18:
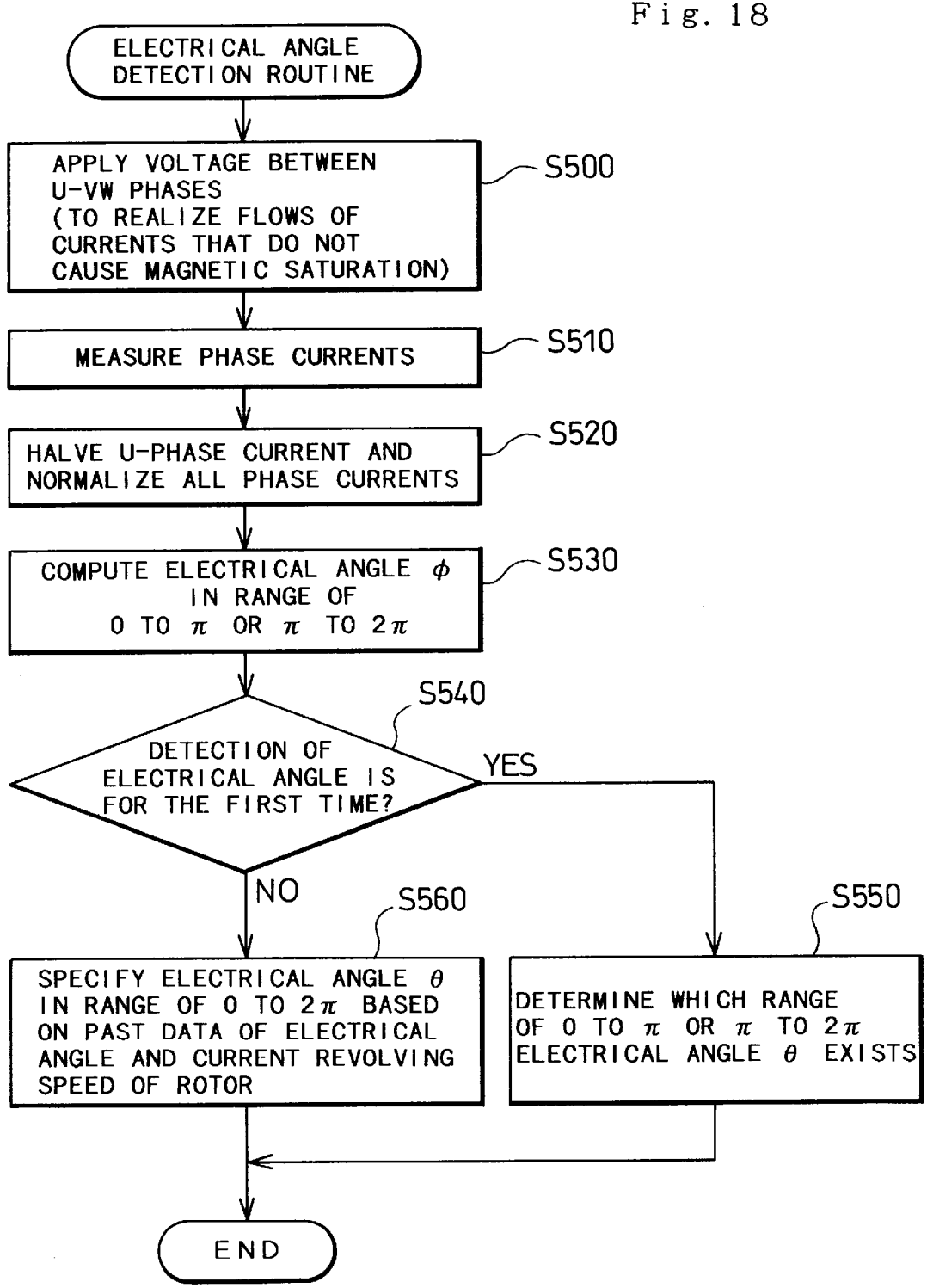
FIG. 18 is a flowchart showing an electrical angle detection routine as another available technique to detect the electrical angle in two separate steps.

The outline of this electrical angle detection technique is shown in the flowchart of FIG. 18. When the program enters the electrical angle detection routine of FIG. 18, the CPU 101 first applies a voltage between the U phase and the VW phase at step S500 and measures phase currents flowing through the respective phase coils in response to the applied voltage at step S510. The magnitude of the voltage applied between the U phase and the VW phase is set to realize the flows of electric currents that do not cause magnetic saturation in the respective phase coils. The relationship between the phase currents flowing through the respective phase coils in response to a voltage applied and the electrical angle is determined in advance and stored as a map in the ROM 102.

Figure 19:
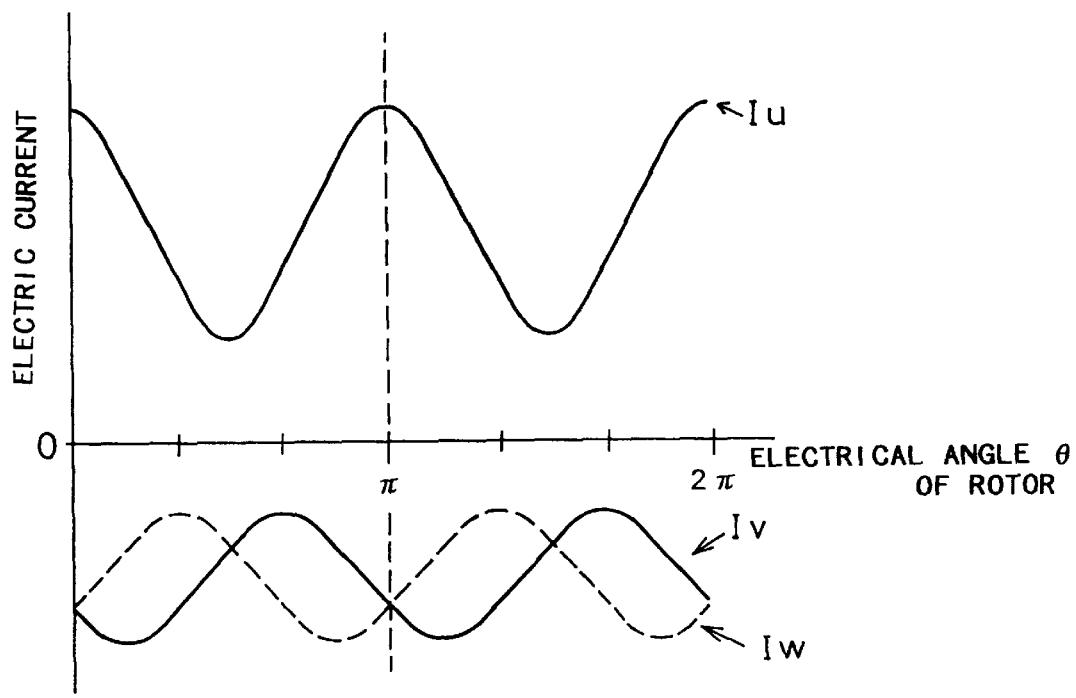
FIG. 19 is a graph showing the phase currents when the technique of FIG. 18 is applied.
Figure 20:
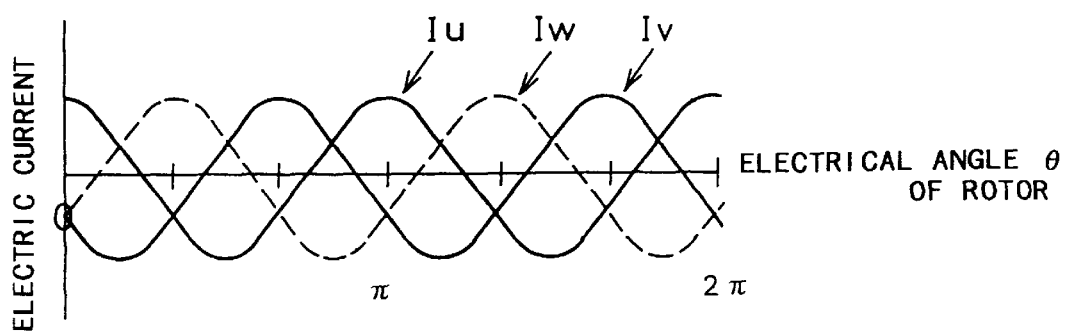
FIG. 20 is a graph showing the normalized state of the respective phase currents.

The observed phase currents are then normalized at step S520. FIG. 19 is a graph showing the electric currents flowing through the respective phases in response to application of the voltage at step S500, which is plotted against the electrical angle θ of the rotor 50. As shown in the graph of FIG. 19, while a positive electric current flows through the U phase that receives application of a positive voltage, negative electric currents flow through the V phase and the W phase that receive application of negative voltages. Since the electric current flowing through the U phase is equal to the sum of the electric currents flowing through the V phase and the W phase, the electric current flowing through the U phase is twice the average of the other two phase currents. A concrete procedure of step S520 accordingly halves the observed U-phase current Iu and shifts the U-phase current Iu to make the average of the U-phase current equal to zero. The procedure then shifts the observed V-phase current Iv and W-phase current Iw to make the respective average currents equal to zero. This results in shifting the respective phase currents Iu, Iv, and Iw by 120 degrees (2π/3) as shown in the graph of FIG. 20. This completes the normalization of the phase currents. Since the magnitude of the voltage applied between the specific phases is set to realize the flows of electric current that do not cause magnetic saturation, the normalized phase currents Iu, Iw, and Iv have substantially the same waveforms.

As clearly understood from the graph of FIG. 20, the phase currents Iu, Iv, and Iw are symmetrical in the range of 0 to π and in the range of π to 2π. This means that the simple measurement of the phase currents Iu, Iv, and Iw can not determine which range the electrical angle θ exists. Referring back to the flowchart of FIG. 18, the method accordingly computes the electrical angle φ either in the range of 0 to π or in the range of π to 2π at step S530, and determines whether or not detection of the electrical angle is carried out for the first time at step S540. In case that detection of the electrical angle is performed for the first time, the method determines whether the electrical angle θ exists in the range of 0 to π or in the range of π to 2π at step S550. The technique applicable here for the determination is, for example, the method described in the first embodiment, which applies a voltage having a magnitude that causes magnetic saturation and unequivocally specifies the electrical angle θ in the range of 0 to 2π. In case that detection of the electrical angle has been already performed, on the other hand, the method specifies the current position of the rotor 50 or the range in which the electrical angle θ exists, based on the past data of the position of the rotor 50 or the electrical angle θ obtained in the previous cycle and the revolving speed of the rotor 50 at step S560. As discussed in the first embodiment, when the electrical angle is detected repeatedly at predetermined intervals, the current position of the rotor 50 is roughly estimated from the current revolving speed of the three-phase synchronous motor 40. There is accordingly no fear of mistakenly specifying the range in which the electrical angle θ exists. This modified method determines the electrical angle θ in the range of 0 to 2π in this manner.

The step of applying a voltage between the specific phases and computing the electrical angle φ either in the range of 0 to π or in the range of π to 2π may be carried out independently of the step of determining which range the electrical angle θ exists. The method of realizing the respective steps and the apparatus for the same are specified in JAPANESE PATENT LAID-OPEN GAZETTE No. 7-177788.

A variety of other structures may be applied for the second electrical angle detection process. One possible structure applies voltages simultaneously to the U, V, and W phases of the three-phase coils and measures the phase currents in response to the applied voltages. The relationship between the respective phase currents Iu, Iv, and Iw and the electrical angle θ is determined in advance and stored as a map. This structure refers to the map and reads the electrical angle corresponding to the observed phase currents. Any other structure may be applied for the second electrical angle detection process as long as it can detect the electrical angle θ at a practical accuracy when the revolving speed of the rotor is less than the predetermined revolving speed.

The present invention is not restricted to the above embodiments or their modifications, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A method of controlling operation of a synchronous motor, said synchronous motor making polyphase alternating currents flow through polyphase windings and rotating a rotor by an interaction of a magnetic field formed by said windings with a magnetic field formed by a permanent magnet, said method comprising the steps of:

detecting an electrical angle of said rotor according to a first detection process immediately after a start of operation of said synchronous motor, and regulating the polyphase currents flowing through said polyphase windings based on the detected electrical angle, said first detection process having a practical accuracy when a revolving speed of said rotor is not less than a predetermined level;

calculating the revolving speed of said rotor based on a variation in detected electrical angle; and detecting the electrical angle of said rotor according to a second detection process in case that the calculated revolving speed is less than the predetermined level, and regulating the polyphase currents flowing through said polyphase windings based on the detected electrical angle, said second detection process having a practical accuracy when the revolving speed of said rotor is less than the predetermined level.

2. A method of controlling operation of a synchronous motor, said synchronous motor making polyphase alternating currents flow through polyphase windings and rotating a rotor by an interaction of a magnetic field formed by said windings with a magnetic field formed by a permanent magnet, said method comprising the steps of:

determining whether or not said rotor rotates at a revolving speed of not less than a predetermined level, prior to a start of operation of said synchronous motor;

detecting an electrical angle of said rotor according to a first detection process in case that said rotor rotates at the revolving speed of not less than the predetermined level, and regulating the polyphase currents flowing through said polyphase windings based on the detected electrical angle, said first detection process having a practical accuracy when the revolving speed of said rotor is not less than the predetermined level; and detecting the electrical angle of said rotor according to a second detection process in case that said rotor rotates at the revolving speed of less than the predetermined level, and regulating the polyphase currents flowing through said polyphase windings based on the detected electrical angle, said second detection process having a practical accuracy when the revolving speed of said rotor is less than the predetermined level.

3. A method in accordance with either one of claim 1, wherein said first detection process detects the electrical angle of said rotor based on a motor model, and said second detection process detects the electrical angle based on an inductance of said polyphase windings.

4. A method in accordance with either one of claim 2, wherein said first detection process detects the electrical angle of said rotor based on a motor model, and said second detection process detects the electrical angle based on an inductance of said polyphase windings.

5. A motor control apparatus that controls operation of a synchronous motor, said synchronous motor making polyphase alternating currents flow through polyphase windings and rotating a rotor by an interaction of a magnetic field formed by said windings with a magnetic field formed by a permanent magnet, said motor control apparatus comprising:

a first electrical angle detection unit that detects an electrical angle of said rotor according to a first detection process, said first detection process having a practical accuracy when a revolving speed of said rotor is not less than a predetermined level;

a second electrical angle detection unit that detects the electrical angle of said rotor according to a second detection process, said second detection process having a practical accuracy when the revolving speed of said rotor is less than the predetermined level;

a revolving speed computation unit that calculates the revolving speed of said rotor at least based on a variation in electrical angle detected by said first electrical angle detection unit;

a switching unit that activates said first electrical angle detection unit to detect the electrical angle of said rotor immediately after a start of operation of said synchronous motor, and activates said revolving speed computation unit to calculate the revolving speed of said rotor based on the electrical angle detected by said first electrical angle detection unit, when the revolving speed calculated by said revolving speed computation unit being less than the predetermined level, said switching unit activating said second electrical angle detection unit to detect the electrical angle of said rotor; and a control unit that regulates the polyphase currents flowing through said polyphase windings based on the electrical angle detected by either one of said first electrical angle detection unit and said second electrical angle detection unit.

6. A motor control apparatus in accordance with claim 5, wherein said first detection process adopted in said first electrical angle detection unit detects the electrical angle of said rotor based on a motor model, and said second detection process adopted in said second electrical angle detection unit detects the electrical angle based on an inductance of said polyphase windings.

7. A motor control apparatus in accordance with claim 5, wherein said second electrical angle detection unit comprises:

a voltage application unit that applies a predetermined voltage to a certain combination selected among said polyphase windings;

a current behavior detection unit that detects behaviors of the polyphase currents flowing through said polyphase windings in response to the voltage applied by said voltage application unit;

a storage unit that stores a relationship between the electrical angle of said rotor and the behaviors of the polyphase currents flowing through said polyphase windings in response to the predetermined voltage applied to said certain combination, said relationship being determined in advance; and an electrical angle computation unit that refers to said relationship stored in said storage unit and specifies the electrical angle of said rotor in a range of 0 to $2\pi$ corresponding to the behaviors of the polyphase currents detected by said current behavior detection unit.

8. A motor control apparatus in accordance with claim 5, wherein said second electrical angle detection unit comprises:

a voltage application unit that applies a predetermined voltage to said polyphase windings;

a current behavior detection unit that detects behaviors of the polyphase currents flowing through said polyphase windings in response to the voltage applied by said voltage application unit;

a driving current detection unit that detects a driving current supplied to said polyphase windings at a time of application of said predetermined voltage;

a storage unit that stores a relationship between the electrical angle of said rotor and the behaviors of the polyphase currents flowing through said polyphase windings in response to application of the predetermined voltage while the driving current flows through said synchronous motor, said relationship being determined in advance: and an electrical angle computation unit that refers to said relationship stored in said storage unit and specifies the electrical angle of said rotor in a range of 0 to $2\pi$ corresponding to the behaviors of the polyphase currents detected by said current behavior detection unit and the driving current detected by said driving current detection unit.

9. A motor control apparatus that controls operation of a synchronous motor, said synchronous motor making polyphase alternating currents flow through polyphase windings and rotating a rotor by an interaction of a magnetic field formed by said windings with a magnetic field formed by a permanent magnet, said motor control apparatus comprising:

a revolving speed determination unit that determines whether or not said rotor rotates at a revolving speed of not less than a predetermined level, prior to a start of operation of said synchronous motor;

a first control unit that detects an electrical angle of said rotor according to a first detection process in case that said rotor rotates at the revolving speed of not less than the predetermined level, and regulates the polyphase currents flowing through said polyphase windings based on the detected electrical angle, said first detection process having a practical accuracy when the revolving speed of said rotor is not less than the predetermined level; and a second control unit that detects the electrical angle of said rotor according to a second detection process in case that said rotor rotates at the revolving speed of less than the predetermined level, and regulates the polyphase currents flowing through said polyphase windings based on the detected electrical angle, said second detection process having a practical accuracy when the revolving speed of said rotor is less than the predetermined level.

10. A motor control apparatus in accordance with claim 9, wherein said revolving speed determination unit comprises:

a short-circuit current detection unit that short-circuits said polyphase windings, through which the polyphase currents flow, for a predetermined time period and detects a short-circuit current flowing through said short-circuited polyphase windings; and a revolving speed computation unit that calculates the revolving speed of said rotor from the detected short-circuit current, wherein said revolving speed determination unit carries out said determination based on the revolving speed calculated by said revolving speed computation unit.

11. A motor control apparatus in accordance with claim 9, wherein said first detection process adopted in said first control unit detects the electrical angle of said rotor based on a motor model, and said second detection process adopted in said second control unit detects the electrical angle based on an inductance of said polyphase windings.

* * * * *